United States Patent
Park et al.

(10) Patent No.: US 11,184,853 B2
(45) Date of Patent: *Nov. 23, 2021

(54) METHOD AND DEVICE FOR TRANSMITTING WAKEUP PACKET IN WIRELESS LAN SYSTEM

(71) Applicant: LG ELECTRONICS INC., Seoul (KR)

(72) Inventors: Eunsung Park, Seoul (KR); Jinyoung Chun, Seoul (KR); Dongguk Lim, Seoul (KR); Jinsoo Choi, Seoul (KR)

(73) Assignee: LG ELECTRONICS, INC, Seoul (KR)

(*) Notice: Subject to any disclaimer, the term of this patent is extended or adjusted under 35 U.S.C. 154(b) by 12 days.

This patent is subject to a terminal disclaimer.

(21) Appl. No.: 16/645,446

(22) PCT Filed: Aug. 20, 2018

(86) PCT No.: PCT/KR2018/009505
§ 371 (c)(1),
(2) Date: Mar. 6, 2020

(87) PCT Pub. No.: WO2019/050191
PCT Pub. Date: Mar. 14, 2019

(65) Prior Publication Data
US 2020/0288396 A1    Sep. 10, 2020

Related U.S. Application Data

(60) Provisional application No. 62/555,073, filed on Sep. 7, 2017, provisional application No. 62/557,098, filed (Continued)

(51) Int. Cl.
*H04W 52/02* (2009.01)
*H04L 27/02* (2006.01)
*H04W 84/12* (2009.01)

(52) U.S. Cl.
CPC ......... *H04W 52/0229* (2013.01); *H04L 27/02* (2013.01); *H04W 84/12* (2013.01)

(58) Field of Classification Search
CPC . H04W 52/0229; H04W 84/12; H04W 52/02; H04L 27/02; H04L 27/26; Y02D 30/70
(Continued)

(56) References Cited

U.S. PATENT DOCUMENTS

2016/0337973 A1    11/2016  Park et al.
2018/0295578 A1*   10/2018  Liu .................... H04L 27/04

OTHER PUBLICATIONS

PCT International Application No. PCT/KR2018/009505, International Search Report dated Nov. 12, 2018, 4 pages.
(Continued)

*Primary Examiner* — Kwang B Yao
*Assistant Examiner* — Syed M Bokhari
(74) *Attorney, Agent, or Firm* — Lee, Hong, Degerman, Kang & Waimey

(57) ABSTRACT

Presented are a method and device for transmitting a wakeup packet in a wireless LAN system. Specifically, the transmission device configures a first wakeup packet having a first data rate by using a first sync field, and a second wakeup packet having a second data rate by using a second sync field. The transmission device transmits the first and second wakeup packets to a receiving device. Here, an OOK scheme is applied to the first and second wakeup packets to configure the first and second wakeup packets as an ON signal or an OFF signal. The first sync field includes a first sequence, and the second sync field includes a second sequence which is a complementary sequence to the first sequence. The number of coefficient 1 and coefficient 0 included in the first sequence is the same. The first and second sequences have a 32 bit length, and each bit of the first and second sequences has a duration of 2 μs.

16 Claims, 18 Drawing Sheets

Related U.S. Application Data on Sep. 11, 2017, provisional application No. 62/558,283, filed on Sep. 13, 2017, provisional application No. 62/558,812, filed on Sep. 14, 2017, provisional application No. 62/560,127, filed on Sep. 18, 2017.

(58) Field of Classification Search
USPC .......................................................... 370/311
See application file for complete search history.

(56) References Cited

OTHER PUBLICATIONS

Minyoung Park, et al., "LP-WUR data rates", doc.: IEEE 802.11-16/0341r0, Mar. 2016, 10 pages.
Rui Cao, et al., "WUR preamble sync field design", doc.: IEEE 802.11-17/0983r0, Jul. 2017, 19 pages.
Steve Shellhammer, et al., "WUR data rates", doc.: IEEE 802.11-17/0990r1, Jul. 2017, 10 pages.
Rui Cao, et al., "WUR preamble sync field design", doc.: IEEE 802.11-17/1343r0, Jul. 2017, 13 pages.

* cited by examiner

FIG. 1
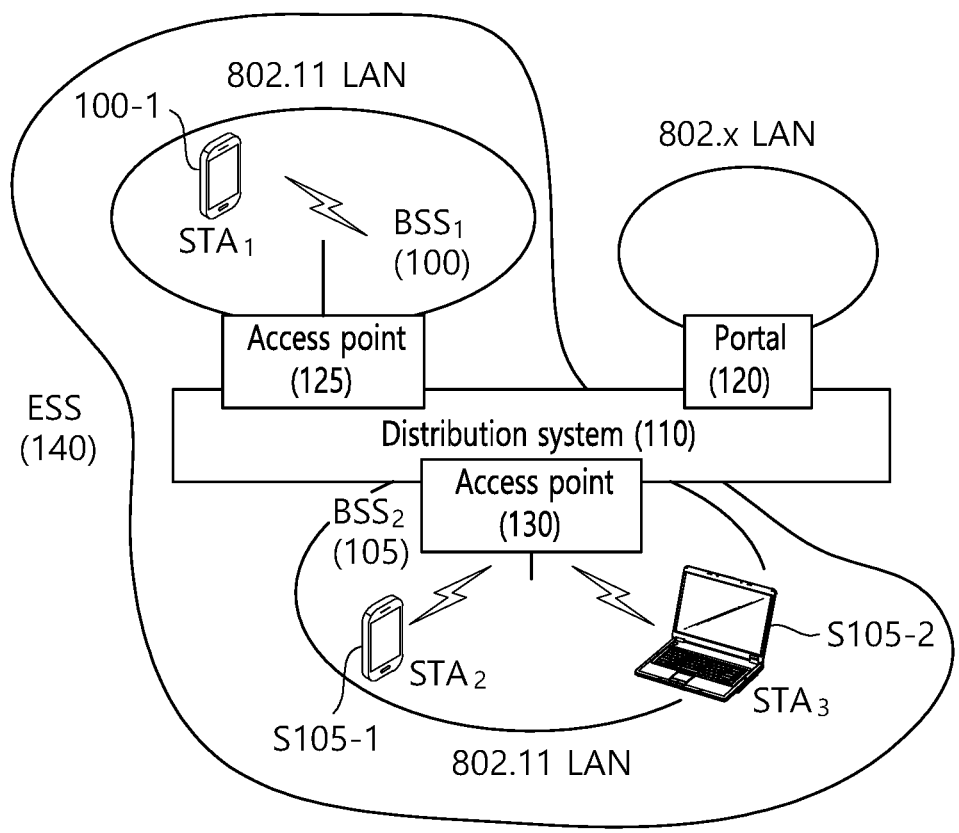
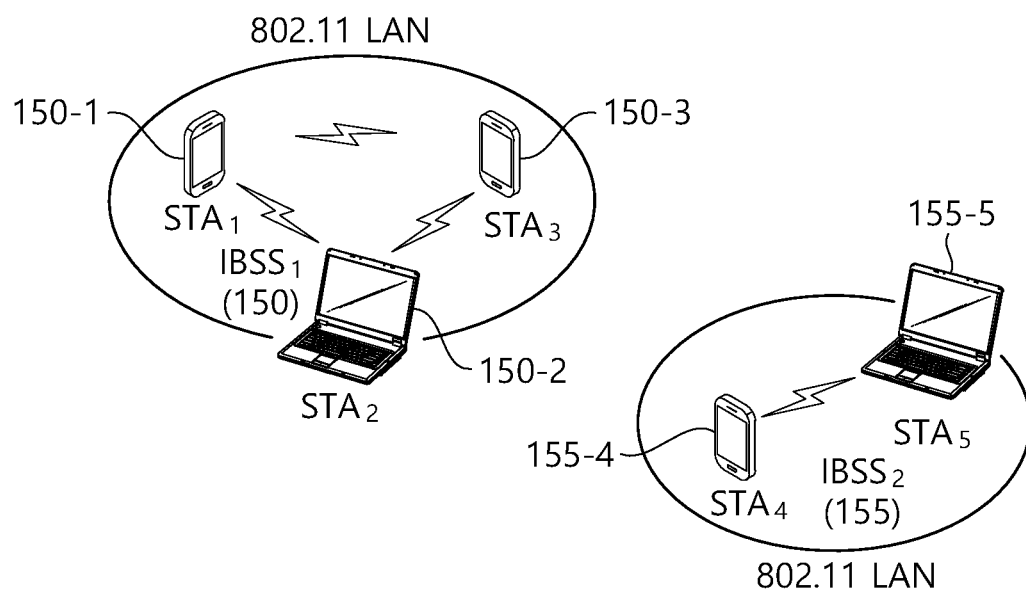

FIG. 11

METHOD AND DEVICE FOR TRANSMITTING WAKEUP PACKET IN WIRELESS LAN SYSTEM

CROSS-REFERENCE TO RELATED APPLICATIONS

This application is the National Stage filing under 35 U.S.C. 371 of International Application No. PCT/KR2018/009505, filed on Aug. 20, 2018, which claims the benefit of U.S. Provisional Application Nos. 62/555,073, filed on Sep. 7, 2017, 62/557,098, filed on Sep. 11, 2017, 62/558,283, filed on Sep. 13, 2017, 62/558,812, filed on Sep. 14, 2017, and 62/560,127, filed on Sep. 18, 2017, the contents of which are all hereby incorporated by reference herein in their entireties.

BACKGROUND OF THE DISCLOSURE

Field of the Disclosure

This specification relates to a scheme for performing low-power communication in a wireless LAN system and, more particularly, to a method and apparatus for transmitting a wake-up packet by applying an OOK method in a wireless LAN system.

Related Art

Discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments such as an environment in which an interference source exists, a dense heterogeneous network environment, and an environment in which a high user load exists, and the like.

An environment which is primarily considered in the next-generation WLAN is a dense environment in which access points (APs) and stations (STAs) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

In detail, scenarios such as wireless office, smart home, stadium, Hotspot, and building/apartment are largely concerned in the next-generation WLAN and discussion about improvement of system performance in a dense environment in which the APs and the STAs are a lot is performed based on the corresponding scenarios.

In the next-generation WLAN, improvement of system performance in an overlapping basic service set (OBSS) environment and improvement of outdoor environment performance, and cellular offloading are anticipated to be actively discussed rather than improvement of single link performance in one basic service set (BSS). Directionality of the next-generation means that the next-generation WLAN gradually has a technical scope similar to mobile communication. When a situation is considered, in which the mobile communication and the WLAN technology have been discussed in a small cell and a direct-to-direct (D2D) communication area in recent years, technical and business convergence of the next-generation WLAN and the mobile communication is predicted to be further active.

SUMMARY OF THE DISCLOSURE

Technical Objects

This specification proposes a method and apparatus for transmitting a wake-up packet by applying an OOK method in a wireless LAN system.

Technical Solutions

An example of this specification proposes a method and device for transmitting a wake-up packet in a wireless LAN system.

The exemplary embodiment of this specification may be performed by the transmitting device. And, a receiving device may correspond to a low-power wake-up receiver, and the transmitting device may correspond to an AP.

First, terms are defined. An on signal may correspond to a signal having an actual power value. An off signal may correspond to a signal having no actual power value.

The transmitting device configures a first wake-up packet having a first data rate based on a first sync field and a second wake-up packet having a second data rate based on a second sync field.

The transmitting device transmits the first and second wake-up packets to the receiving device.

Hereinafter, how to configure the first and second wake-up packets will be described.

The first and second wake-up packets are configured of an on signal or an off signal by applying an On-Off Keying (OOK) method (or scheme).

The on signal or the off signal is generated by applying a third sequence to 13 consecutive subcarriers in a 20 MHz band and by performing 64-point Inverse Fast Fourier Transform (IFFT).

For example, coefficients may be inserted to all of the 13 subcarriers. At this point the generated signal may be a signal having a length of 3.2 us and not having any cycle period. A cyclic prefix (CP) is inserted to the generated signal, thereby generating an on signal or off signal having a length of 4 us. The coefficient may be selected from 1, −1, j or −j.

As another example, coefficients may be inserted in the 13 subcarriers in units of 2 subcarriers, and 0 may be inserted in the remaining subcarriers. More specifically, the first sequence may be configured of coefficients in units of 2 spaces and may be configured of 0 in the remaining parts. At this point, the generated signal may be a 3.2 us signal having a cycle period of 1.6 us. A cyclic prefix (CP) may be inserted to the generated signal, or masking may be performed without inserting any CP. Herein, masking may correspond to a method of covering part of the signal and obtaining only the remaining part of the signal. More specifically, by obtaining part of the generated signal, an on signal or off signal having a length of 2 us may be generated (CP+1.6 us).

As another example, coefficients may be inserted in the 13 subcarriers in units of 4 subcarriers, and 0 may be inserted in the remaining subcarriers. More specifically, the first sequence may be configured of coefficients in units of 4 spaces and may be configured of 0 in the remaining parts. At this point, the generated signal may be a 3.2 us signal having a cycle period of 0.8 us. A cyclic prefix (CP) may be inserted to the generated signal, or masking may be performed without inserting any CP. Herein, masking may correspond to a method of covering part of the signal and obtaining only the remaining part of the signal. More specifically, by obtaining part of the generated signal, an on signal or off signal having a length of 1 us may be generated (CP+0.8 us).

As another example, coefficients may be inserted in the 13 subcarriers in units of 8 subcarriers, and 0 may be inserted in the remaining subcarriers. More specifically, the first sequence may be configured of coefficients in units of 8 spaces and may be configured of 0 in the remaining parts. At this point, the generated signal may be a 3.2 us signal having a cycle period of 0.4 us. A cyclic prefix (CP) may be inserted to the generated signal, or masking may be performed without inserting any CP. Herein, masking may correspond to a method of covering part of the signal and obtaining only the remaining part of the signal. More specifically, by obtaining part of the generated signal, an on signal or off signal having a length of 0.5 us may be generated (CP+0.4 us).

The off signal may be generated by inserting 0s to 13 consecutive subcarriers of the 20 MHz band and by performing 64-point IFFT. The off signal may also have the lengths of 2 us, 1 us, or 0.5 us by performing masking (CP+1.6 us, CP+0.8 us, CP+0.4 us).

How to configure the first and second sync fields will hereinafter be described.

The first sync field includes a first sequence. The second sync field includes a second sequence, which is a complementary sequence of the first sequence. Additionally, the number of coefficients 1 and the number of coefficients 0 included in the first sequence are the same. Accordingly, the number of coefficients 1 and the number of coefficients 0 included in the second sequence may also be the same. This is to indicate that signs of cross-correlation values according to the first sequence and the second sequence, which will be described later on, are opposite signs.

The receiving device may use the first sequence and the second sequence to perform cross-correlation for the received signal (wake-up packet). At this point, since the first sequence and the second sequence are in a complementary sequence relation, the receiving device may perform cross-correlation by using only the first sequence. Thus, complexity in the receiving device may be reduced. In other words, there is no need to perform cross-correlation by using both the first sequence and the second sequence. At this point, a cross-correlation value for a signal that is received by using the first sequence and a cross-correlation value for a signal that is received by using the second sequence may have the same size and the opposite sign.

Accordingly, in case the sign is +, this may indicate a wake-up packet having a low data rate (LDR), and, in case the signa is −, this may indicate a wake-up packet having a high data rate (HDR). More specifically, the transmitting device may indicate the data rates being applied to the wake-up packet through the signs. Thus, the transmitting device may be capable of indicating the data rates being applied to the wake-up packet by using two different types of sync fields (first sync field and second sync field).

For example, the first data rate may be 62.5 Kbps, and the second data rate may be 250 Kbps. Additionally, in case the sign is +, this may indicate an HDR, and in case the sign is −, this may indicate an LDR.

Additionally, the first sequence and the second sequence have the lengths of 32 bits. Each bit of the first sequence and the second sequence has a duration of 2 us. One bit of the first sequence may correspond to one symbol configuring the first sync field. Additionally, one bit of the second sequence may correspond to one symbol configuring the second sync field.

For example, the first sequence may be [1 0 1 0 0 1 0 0 1 0 1 1 1 0 1 1 0 0 0 1 0 1 1 1 0 0 1 1 1 0 0 0]. At this point, the second sequence may be [0 1 0 1 1 0 1 1 0 1 0 0 0 1 0 0 1 1 1 0 1 0 0 0 1 1 0 0 0 1 1 1]. More specifically, the first sequence and the second sequence may have a complementary sequence relation.

As another example, the first sequence may be [1 0 1 1 0 0 0 1 1 1 0 0 1 1 0 1 0 1 1 1 1 0 1 0 0 0 1 0 0 1 0]. At this point, the second sequence may be [0 1 0 0 1 1 1 1 0 0 0 1 1 0 0 1 0 1 0 0 0 0 1 0 1 1 1 0 1 1 0 1]. More specifically, the first sequence and the second sequence may have a complementary sequence relation.

As another example, the first sequence may be [1 0 1 1 0 0 1 1 1 0 0 0 0 1 1 0 1 0 1 0 0 1 0 0 0 1 0 1 0 1 1 1]. At this point, the second sequence may be [0 1 0 0 1 1 0 0 0 1 1 1 1 0 0 1 0 1 0 1 1 0 1 1 1 0 1 0 1 0 0 0]. More specifically, the first sequence and the second sequence may have a complementary sequence relation.

The first sync field may be included in a preamble of the first wake-up packet. At this point, a length of the preamble of the first wake-up packet may be determined based on the first data rate.

Additionally, the second sync field may be included in a preamble of the second wake-up packet. At this point, a length of the preamble of the second wake-up packet may be determined based on the second data rate. More specifically, the length of the preamble may be adjusted according to the data rate being applied to the wake-up packet.

Additionally, the first sync field may include a sequence configured by repeating the first sequence 2 times. The first sync field may have a duration of 128 us. This is because the first sequence has a length of 32 bits and each bit of the first sequence has a duration of 2 us (32*2*2).

Additionally, the second sync field may have a duration of 64 us. This is because the second sequence has a length of 32 bits and each bit of the second sequence has a duration of 2 us (32*2). In other words, the second sequence is not repeated and may be directly included in the second sync field.

Effects of the Disclosure

According to an example of this specification, by having a transmitting device transmit a wake-up packet after generating the wake-up packet by applying an OOK modulation method, a receiving device may reduce power consumption by using an envelope detector when performing wake-up decoding. Accordingly, the receiving device may decode the wake-up packet with minimum power.

Additionally, the transmitting device may indicate a data rate being applied to a wake-up packet by using two types of sync fields. More specifically, since the sequences included in each sync are in a complementary sequence relation, a receiving device may perform cross-correlation by using only one sequence. Thus, complexity and overhead of the receiving device may be reduced.

BRIEF DESCRIPTION OF THE DRAWINGS

FIG. 1 is a conceptual view illustrating the structure of a wireless local area network (WLAN).

FIG. 11 illustrates various examples of a symbol repetition method repeating n number of symbols according to an exemplary embodiment of this specification.

DESCRIPTION OF EXEMPLARY EMBODIMENTS

Figure 2:
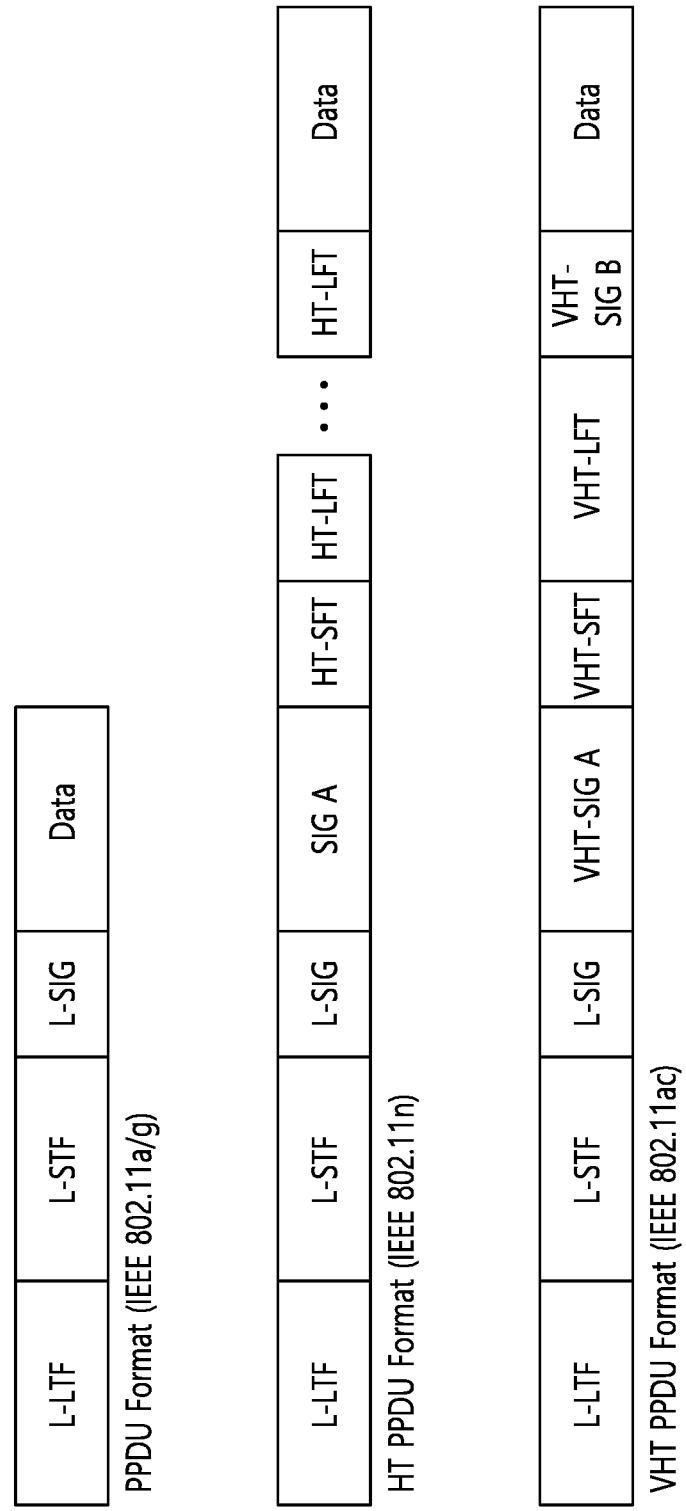
FIG. 2 is a diagram illustrating an example of a PPDU used in an IEEE standard.

FIG. 1 is a conceptual view illustrating the structure of a wireless local area network (WLAN).

An upper part of FIG. 1 illustrates the structure of an infrastructure basic service set (BSS) of institute of electrical and electronic engineers (IEEE) 802.11.

Referring the upper part of FIG. 1, the wireless LAN system may include one or more infrastructure BSSs (100, 105) (hereinafter, referred to as BSS). The BSSs (100, 105) as a set of an AP and an STA such as an access point (AP) (125) and a station (STA1) (100-1) which are successfully synchronized to communicate with each other are not concepts indicating a specific region. The BSS (105) may include one or more STAs (105-1, 105-2) which may be joined to one AP (130).

The BSS may include at least one STA, APs (125, 130) providing a distribution service, and a distribution system (DS) (110) connecting multiple APs.

The distribution system (110) may implement an extended service set (ESS) (140) extended by connecting the multiple BSSs (100, 105). The ESS (140) may be used as a term indicating one network configured by connecting one or more APs (125, 130) through the distribution system (110). The AP included in one ESS (140) may have the same service set identification (SSID).

A portal (120) may serve as a bridge which connects the wireless LAN network (IEEE 802.11) and another network (e.g., 802.X).

In the BSS illustrated in the upper part of FIG. 1, a network between the APs (125, 130) and a network between the APs (125, 130) and the STAs (100-1, 105-1, 105-2) may be implemented. However, the network is configured even between the STAs without the APs (125, 130) to perform communication. A network in which the communication is performed by configuring the network even between the STAs without the APs (125, 130) is defined as an Ad-Hoc network or an independent basic service set (IBSS).

A lower part of FIG. 1 illustrates a conceptual view illustrating the IBSS.

Referring to the lower part of FIG. 1, the IBSS is a BSS that operates in an Ad-Hoc mode. Since the IBSS does not include the access point (AP), a centralized management entity that performs a management function at the center does not exist. That is, in the IBSS, STAs (150-1, 150-2, 150-3, 155-4, 155-5) are managed by a distributed manner. In the IBSS, all STAs (150-1, 150-2, 150-3, 155-4, 155-5) may be constituted by movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), a user equipment (UE), a mobile station (MS), a mobile subscriber unit, or simply a user.

The term 'user' may be used in various meanings. For example, the term 'user' may be used to mean a STA participating in uplink MU MIMO and/or uplink OFDMA transmission in wireless LAN communication, but is not limited thereto.

FIG. 2 is a diagram illustrating an example of a PPDU used in an IEEE standard.

As illustrated in FIG. 2, various types of PHY protocol data units (PPDUs) may be used in a standard such as IEEE a/g/n/ac, and so on. In detail, LTF and STF fields include a training signal, SIG-A and SIG-B include control information for a receiving station, and a data field includes user data corresponding to a PSDU.

In this embodiment, an improved technique is provided, which is related to a signal (alternatively, a control information field) used for the data field of the PPDU. The signal provided in the embodiment may be applied onto high efficiency PPDU (HE PPDU) according to an IEEE 802.11ax standard. That is, the signal improved in the embodiment may be HE-SIG-A and/or HE-SIG-B included in the HE PPDU. The HE-SIG-A and the HE-SIG-B may be represented even as the SIG-A and SIG-B, respectively. However, the improved signal proposed in the embodiment is not particularly limited to an HE-SIG-A and/or HE-SIG-B standard and may be applied to control/data fields having various names, which include the control information in a wireless communication system transferring the user data.

Figure 3:
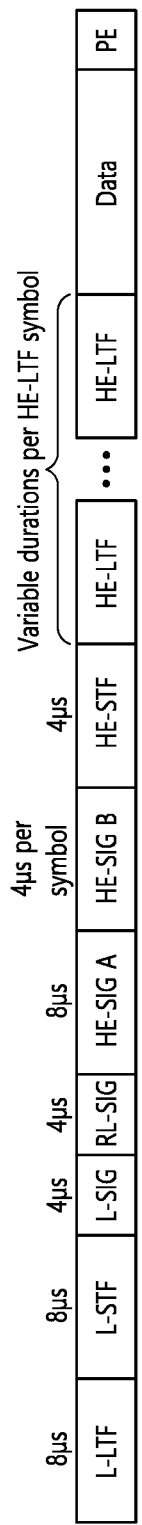
FIG. 3 is a diagram illustrating an example of an HE PDDU.

FIG. 3 is a diagram illustrating an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted during an illustrated time period (that is, 4 or 8 μs).

A PPDU used in the IEEE standard is described as a PPDU structure being transmitting mainly within a channel bandwidth of 20 MHz. A PPDU structure that is transmitted within a bandwidth (e.g., 40 MHz, 80 MHz) that is wider than the channel bandwidth of 20 MHz may be a structure applying linear scaling of the PPDU structure being used in the channel bandwidth of 20 MHz.

The PPDU used in the IEEE standard is generated based on a 64 Fast Fourier Transform (FFT), and a cyclic prefix (CP) portion may be ¼. In this case, the length of a valid (or effective) symbol section (or FFT section) may be equal to 3.2 us, a CP length may be equal to 0.8 us, and a symbol duration may be equal to 4 us (=3.2 us+0.8 us), which may be a sum of the length of the valid symbol section and the CP length.

A wireless network is ubiquitous, and the wireless network is generally installed indoors but is also often installed outdoors. The wireless network transmits and receives information using various techniques. For example, although the wireless network will not be limited only to this, two of the most broadly supplied techniques that are used for communication are an IEEE 802.11n standard and an IEEE 802.11ac standard, which follow the IEEE 802.11 standard.

The IEEE 802.11 standard designates a common Medium Access Control (MAC) layer, which provides various functions for operating the IEEE 802.11 based wireless LAN (WLAN). The MAC layer controls access of shared radio, and, using a protocol that enhances communication through a radio medium, the MAC layer manages and maintains communication between IEEE 802.11 stations (e.g., a wireless network card (NIC) of a personal computer (PC), another wireless device or stations (STA), and an access point (AP)).

As the next new product of the 802.11ac, IEEE 802.11ax was proposed in order to enhance efficiency of a WLAN network, most particularly, in high-density regions, such as public hotspots and other high-traffic regions. Additionally, the IEEE 802.11 may also use orthogonal frequency division multiple access (OFDMA). A High Efficiency WLAN study group (HEW SG) within an IEEE 802.11 Work Group considers an enhancement in spectrum efficiency in order to enhance the system throughput/surface in a high-density scenario of an access point (AP) and/or station (STA).

Although small computing devices, such as wearable devices, sensors, mobile devices, and so on, are restricted due to their compact battery capacity, small computing devices support wireless communication techniques, such as Wi-Fi, Bluetooth®, Bluetooth® Low Energy (BLE), and so on, and, then, the small computing devices should exchange data by being connected to other computing devices, such as smart phones, tablets, personal computers, and so on. Since such communication consumes power, it is important to minimize power consumption of such communication. One of the most ideal strategies for minimizing power consumption is to maintain data transmission and reception without excessively increasing delay (or latency) and to turn off the power for communication blocks as frequently as possible. More specifically, a communication block is transmitted immediately before data reception, and the communication block is turned on only when data that needs to be woken up exists, and, during the rest of the time, the power of the communication block is turned off.

Hereinafter, a low-power wake-up receiver (LP-WUR) will be described in detail.

The communication system (or communication sub-system) that is described in this specification includes a main radio (802.11) and a low-power wake-up receiver.

The main radio is used for the transmission and reception of user data. The main radio is turned off when there is no data or packet that is to be transmitted. The low-power wake-up receiver wakes up the main radio when there is a packet that is to be received. In this case, the user data is transmitted and received by the main radio.

The low-power wake-up receiver is not used (or provided) for user data. The low-power wake-up receiver is a receiver for simply waking up a main radio. More specifically, the low-power wake-up receiver does not include a transmitter. The low-power wake-up receiver is activated while the main radio is turned off. During its activated state, the low-power wake-up receiver aims to achieve its target power consumption of less than 1 mW. Additionally, the low-power wake-up receiver uses a narrow band of less than 5 MHz. Furthermore, a target transmission range of the low-power wake-up receiver is the same as a target transmission range of the legacy 802.11.

Figure 4:
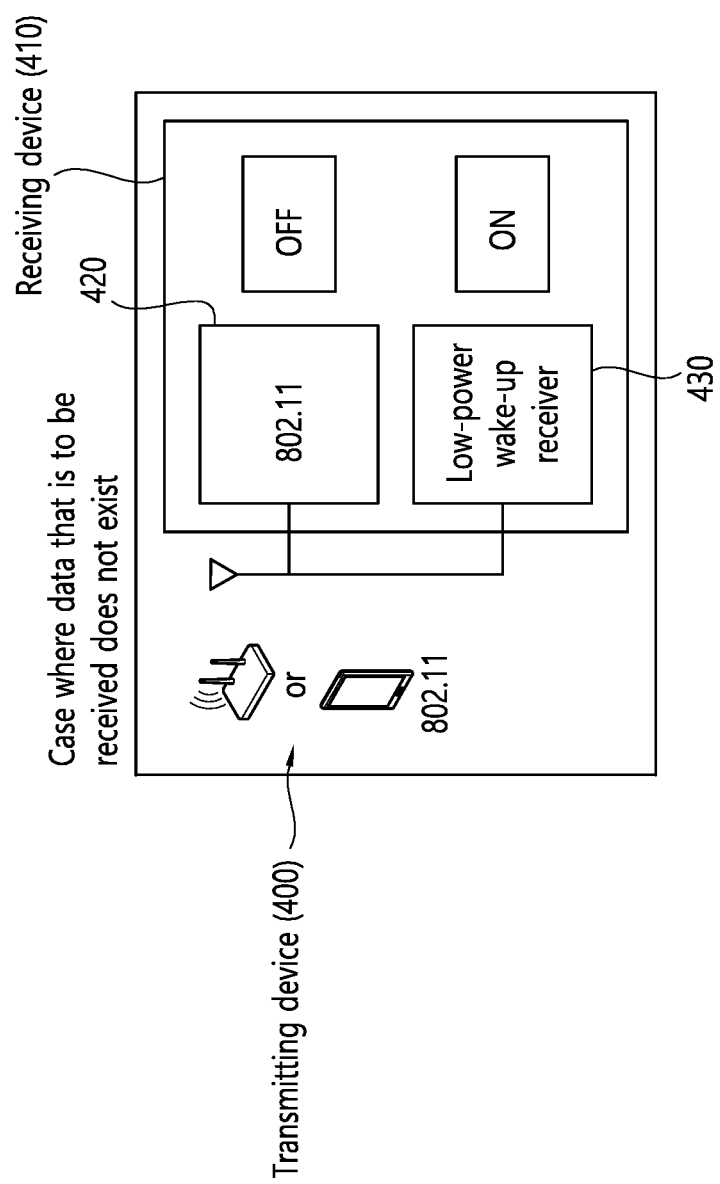
FIG. 4 is a diagram illustrating a low-power wake-up receiver in an environment where data is not received.
Figure 5:
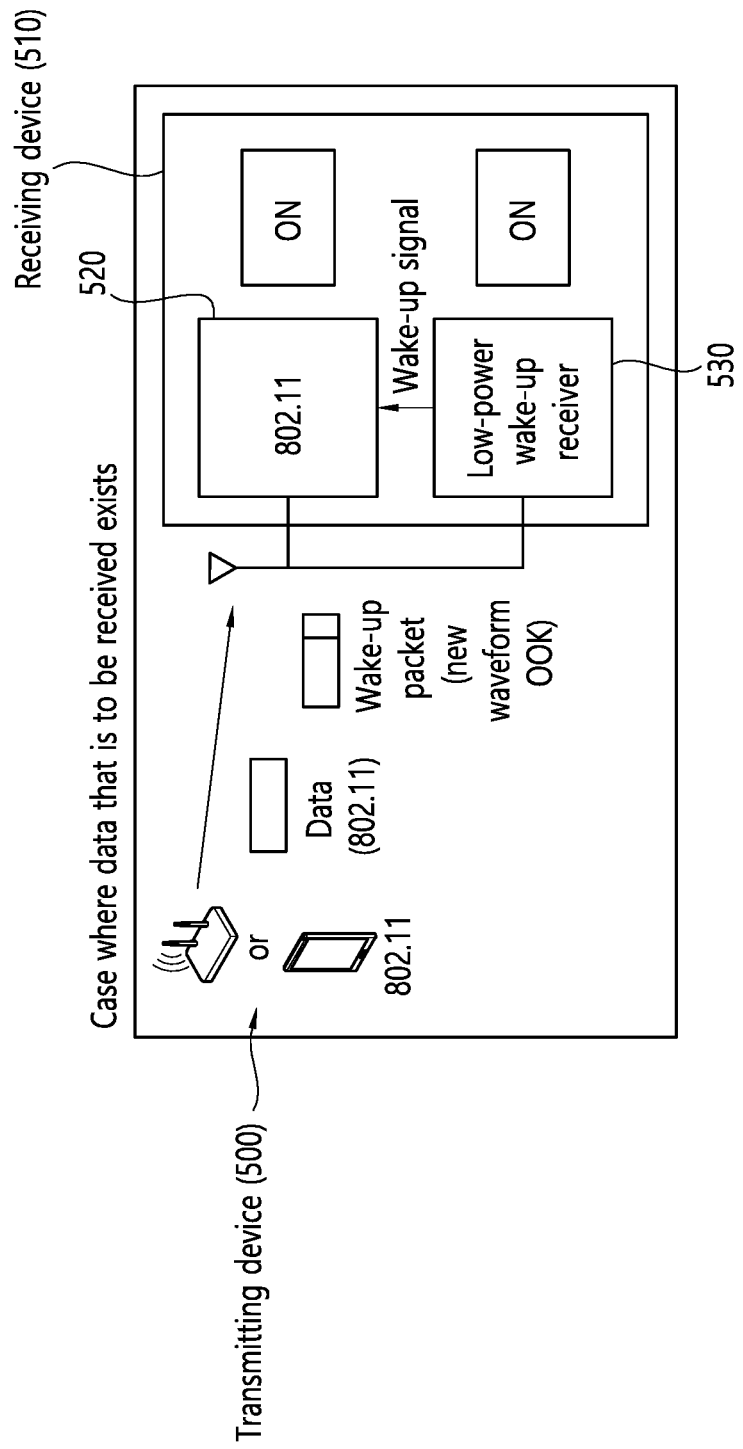
FIG. 5 is a diagram illustrating a low-power wake-up receiver in an environment where data is received.

FIG. 4 is a diagram illustrating a low-power wake-up receiver in an environment where data is not received. FIG. 5 is a diagram illustrating a low-power wake-up receiver in an environment where data is received.

As shown in FIG. 4 and FIG. 5, in case data that is to be transmitted and received exists, one of the methods for implementing the most ideal transmission and reception strategy is to add a low-power wake-up receiver (LP-WUR) that is capable of waking up a main radio, such as Wi-Fi, Bluetooth® radio, Bluetooth® Low Energy (BLE) radio, and so on.

Referring to FIG. 4, the Wi-Fi/BT/BLE radio (420) is turned off, and the low-power wake-up receiver (430) is turned on in a state where data is not received. According to part of the related studies, the power consumption of such low-power wake-up receiver (LP-WUR) may be less than 1 mW.

However, as shown in FIG. 5, if a wake-up packet is received, the low-power wake-up receiver (530) wakes up the entire (or whole) Wi-Fi/BT/BLE radio (520) so that a data packet following the wake-up packet can be accurately received. However, in some cases, actual data or an IEEE 802.11 MAC frame may be included in the wake-up packet. In this case, although the entire Wi-Fi/BT/BLE radio (520) cannot be woken up, the necessary process should be carried out by waking up only part of the Wi-Fi/BT/BLE radio (520). This may result in a considerable amount of power saving.

An exemplary technique that is described in this specification defines a method of a segmented wake-up mode for a Wi-Fi/BT/BLE radio using a low-power wake-up receiver. For example, actual data being included in a wake-up packet may be directly delivered to a memory block without waking up the Wi-Fi/BT/BLE radio.

As another example, in case an IEEE 802.11 MAC frame is included in the wake-up packet, only a MAC processor of the Wi-Fi/BT/BLE wireless device (or radio) needs to be woken up in order to process the IEEE 802.11 MAC frame, which is included in the wake-up packet. More specifically, the power of a PHY module of the Wi-Fi/BT/BLE radio may be turned off or maintained in a low-power mode.

Since a plurality of segmented wake-up modes for a Wi-Fi/BT/BLE radio using a low-power wake-up receiver are defined, when a wake-up packet is received, the power of the Wi-Fi/BT/BLE radio must be turned on. However, according to the exemplary embodiment of this specification, only a necessary (or required) part (or configuration element) of the Wi-Fi/BT/BLE radio may be selectively woken up, thereby saving a larger amount of energy and reducing stand-by (or waiting) time. A large number of solutions using the low-power wake-up receiver wakes up the entire Wi-Fi/BT/BLE radio when receiving a wake-up packet. According to an exemplary aspect that is discussed in this specification, since only a part (or element) of the Wi-Fi/BT/BLE radio that is required for processing the receiving data is woken up, a considerable amount of energy is saved, and unnecessary stand-by (or waiting) time that is needed for waking up the main radio may be reduced.

Additionally, according to this exemplary embodiment, the low-power wake-up receiver (530) may wake up the main radio (520) based on the wake-up packet that is transmitted from a transmitting apparatus (500).

Furthermore, the transmitting apparatus (500) may be configured to transmit the wake-up packet to a receiving apparatus (510). For example, the transmitting apparatus (500) may instruct the low-power wake-up receiver (530) to wake up the main radio (520).

Figure 6:
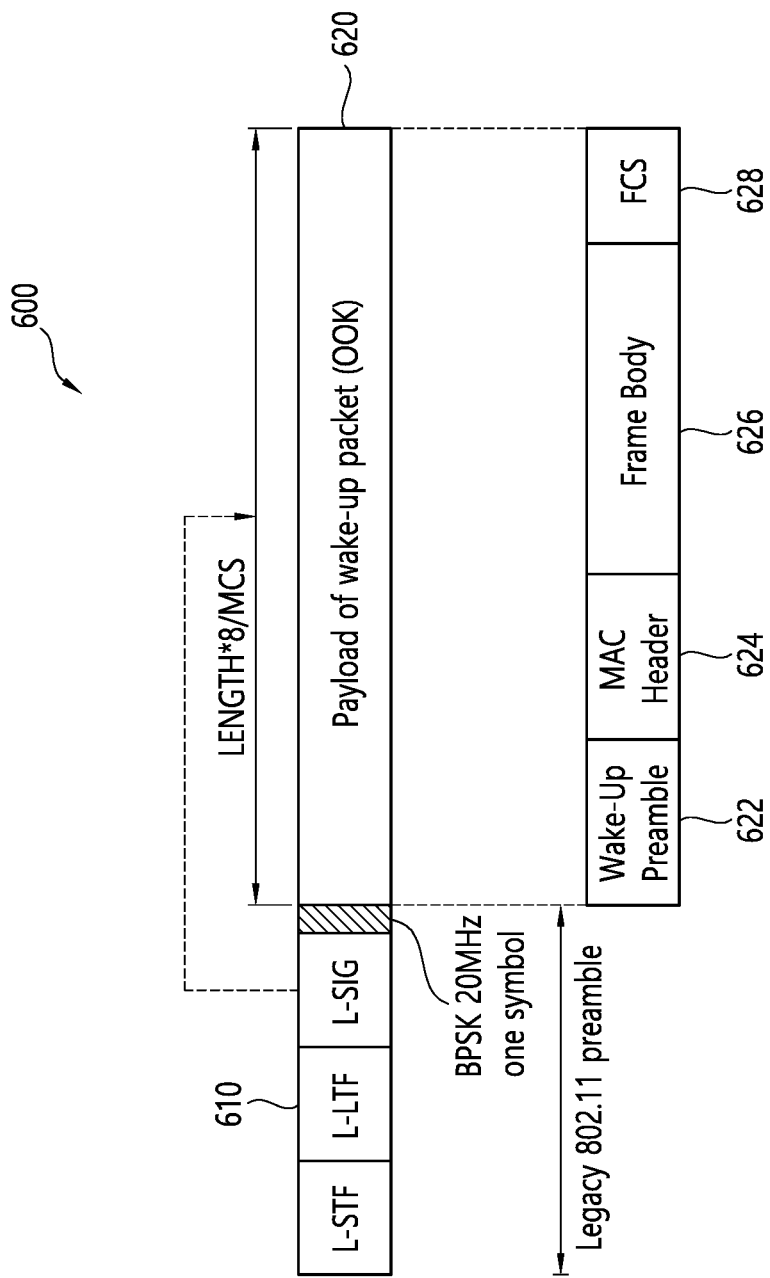
FIG. 6 illustrates an example of a wake-up packet structure according to an exemplary embodiment of this specification.

FIG. 6 illustrates an example of a wake-up packet structure according to an exemplary embodiment of this specification.

A wake-up packet may include one or more legacy preambles. One or more legacy devices may decode or process the legacy preamble(s).

Additionally, the wake-up packet may include a payload after a legacy preamble. The payload may be modulated using a simple modulation scheme, e.g., an On-Off Keying (OOK) scheme.

Referring to FIG. 6, the transmitting apparatus may be configured to generate and/or transmit a wake-up packet (600). Furthermore, the receiving apparatus may be configured to process the received wake-up packet (600).

Additionally, the wake-up packet (600) may include a legacy preamble, which is defined by the IEEE 802.11 specification, or another random preamble (610). Furthermore, the wake-up packet (600) may also include a payload (620).

A legacy preamble provides a coexistence with a legacy STA. The legacy preamble (610) for the coexistence uses an L-SIG field for protecting the packet. Through the L-SIG field within the legacy preamble (610), an 802.11 STA may detect a beginning (or a start point) of the legacy preamble (610). Furthermore, through the L-SIG field within the legacy preamble (610), the 802.11 STA may know (or acknowledge) an end (or last part) of the packet. Additionally, by adding a symbol that is modulated using BPSK after the L-SIG, a false alarm of an 802.11n terminal (or device) may be reduced. A symbol (4 us) that is modulated using BPSK also has a 20 MHz bandwidth, just as the legacy part. The legacy preamble (610) is a field for a third party legacy STA (an STA not including an LP-WUR). The legacy preamble (610) is not decoded by the LP-WUR.

The payload (620) may include a wake-up preamble (622). The wake-up preamble (622) may include a sequence of bits that are configured to identify the wake-up packet (600). The wake-up preamble (622) may, for example, include a PN sequence.

Additionally, the payload (620) may include a MAC header (624) including address information of a receiving apparatus, which receives the wake-up packet (600), or an identifier of the receiving apparatus.

Additionally, the payload (620) may include a frame body (626), which may include other information of the wake-up packet. For example, length or size information of the payload may be included in the frame body (626).

Furthermore, the payload (620) may include a frame check sequence (FCS) field (628) including a cyclic redundancy check (CRC) value. For example, the FCS field (628) may include a CRC-8 value or a CRC-16 value of the MAC header (624) and the frame body (626).

Figure 7:
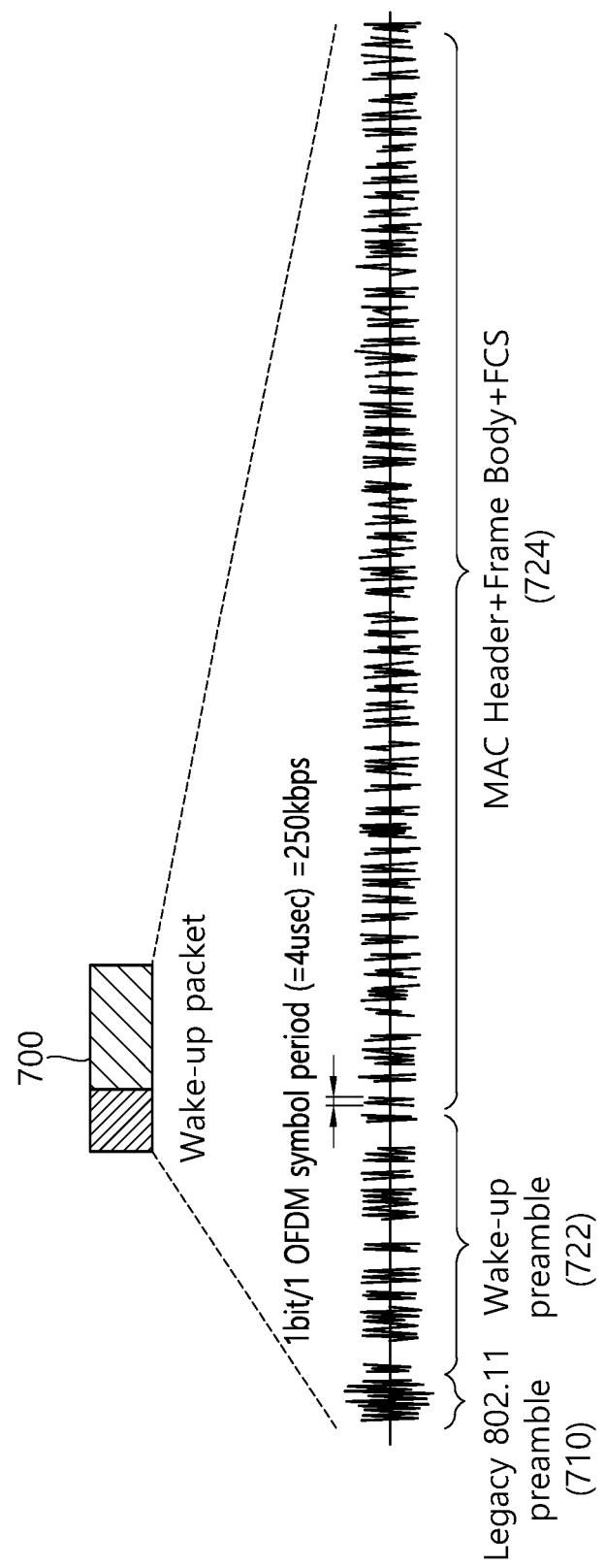
FIG. 7 illustrates a signal waveform of a wake-up packet according to an exemplary embodiment of this specification.

FIG. 7 illustrates a signal waveform of a wake-up packet according to an exemplary embodiment of this specification.

Referring to FIG. 7, a wake-up packet (700) includes a legacy preamble (802.11) preamble (710) and a payload being modulated by OOK. In other words, the wake-up packet (700) is configured of a format in which a legacy preamble and a new LP-WUR signal waveform coexist.

Additionally, the legacy preamble (710) may be modulated based on an OFDM modulation scheme. More specifically, the OOK scheme is not applied to the legacy preamble (710). Conversely, the payload may be modulated based on the OOK scheme. However, a wake-up preamble (722) within the payload may be modulated based on a different modulation scheme.

If the legacy preamble (710) is transmitted within a channel bandwidth of 20 MHz in which 64 FFT is applied, the payload may be transmitted within a channel bandwidth of approximately 4.06 MHz. This will be described in more detail in the following description of an OOK pulse designing method.

Firstly, a modulation method using the OOK scheme and a Manchester coding method will be described in detail.

Figure 8:
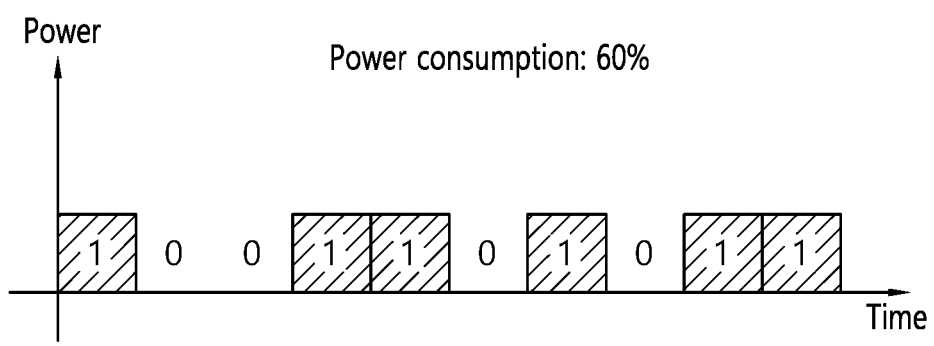
FIG. 8 illustrates a diagram for describing a principle for determining consumed power based on a ratio between bit value 1 and 0 that configure information of a binary sequence format by using the OOK scheme.

FIG. 8 illustrates a diagram for describing a principle for determining consumed power based on a ratio between bit value 1 and 0 that configure information of a binary sequence format using the OOK scheme.

Referring to FIG. 8, information of a binary sequence format having 1 or 0 as the bit values is expressed in the drawing. By using such bit values of 1 or 0 of the binary sequence format information, an OOK modulation scheme communication may be carried out. More specifically, by considering the bit values of the binary sequence format information, the OOK modulation scheme communication may be carried out. For example, in case of using a light-emitting diode in visible light communication, in case the bit value configuring the binary sequence format information is equal to 1, the light-emitting diode is turned on, and, in case the bit value is equal to 0, the light-emitting diode is turned off. Thus, the light-emitting diode may be turned on and off (i.e., flicker). As the receiving apparatus receives and recovers the data being transmitted in the form of visible light based on the above-described on and off state (or flickering) of the light-emitting diode, the communication using visible light may be carried out. However, since the flickering of the light-emitting diode cannot be recognized by the human eye, people think and feel that the lighting is continuously maintained in the on state.

For simplicity in the description, as shown in FIG. 8, information of a binary sequence format having 10 bit values is used in this specification. Referring to FIG. 8, information of a binary sequence format having a value of '1001101011'. As described above, in case the bit value is equal to 1, the transmitting apparatus is turned on, and, in case the bit value is equal to 0, the transmitting apparatus is turned off. Accordingly, among the 10 bit values, the symbols are turned on in 6 bit values. In this case, given that 100% of the consumed power is used when all of the symbols are turned on in all of the 10 bit values, and, in case a duty cycle shown in FIG. 8 is followed, the consumed power is 60%.

More specifically, it may be said that the consumed power of the transmitter is determined based on a ratio between 1s and 0s configuring the binary sequence format information. In other words, in case there is a constraint condition specifying that the consumed power of the transmitter should be maintained at a specific value, the ratio between the 1s and 0s configuring the binary sequence format information should also be maintained. For example, in case of a lighting device, since the lighting should be maintained at a specific luminance value that is wanted by the users, the ratio between the 1s and 0s configuring the binary sequence format information should also be maintained accordingly.

However, for the wake-up receiver (WUR), since the receiving apparatus is the subject, the transmission power is not significantly important. One of the main reasons for using the OOK is because the amount of consumed power during the decoding of a received signal is considerably small. Before performing the decoding, the difference between the amount of consumed power in the main radio and in the WUR is small. However, as the decoding process is carried out, the difference in the amount of consumed power becomes apparent. The approximate amount of consumed power is as shown below.

The current Wi-Fi power consumption is approximately 100 mW. More specifically, power may be consumed as follows: Resonator+Oscillator+PLL (1500 uW)->LPF (300 uW)->ADC (63 uW)->decoding processing (OFDM receiver) (100 mW).

However, the WUR power consumption is approximately 1 mW. More specifically, power may be consumed as follows: Resonator+Oscillator (600 uW)->LPF (300 uW)->ADC (20 uW)->decoding processing (Envelope detector) (1 uW).

Figure 9:
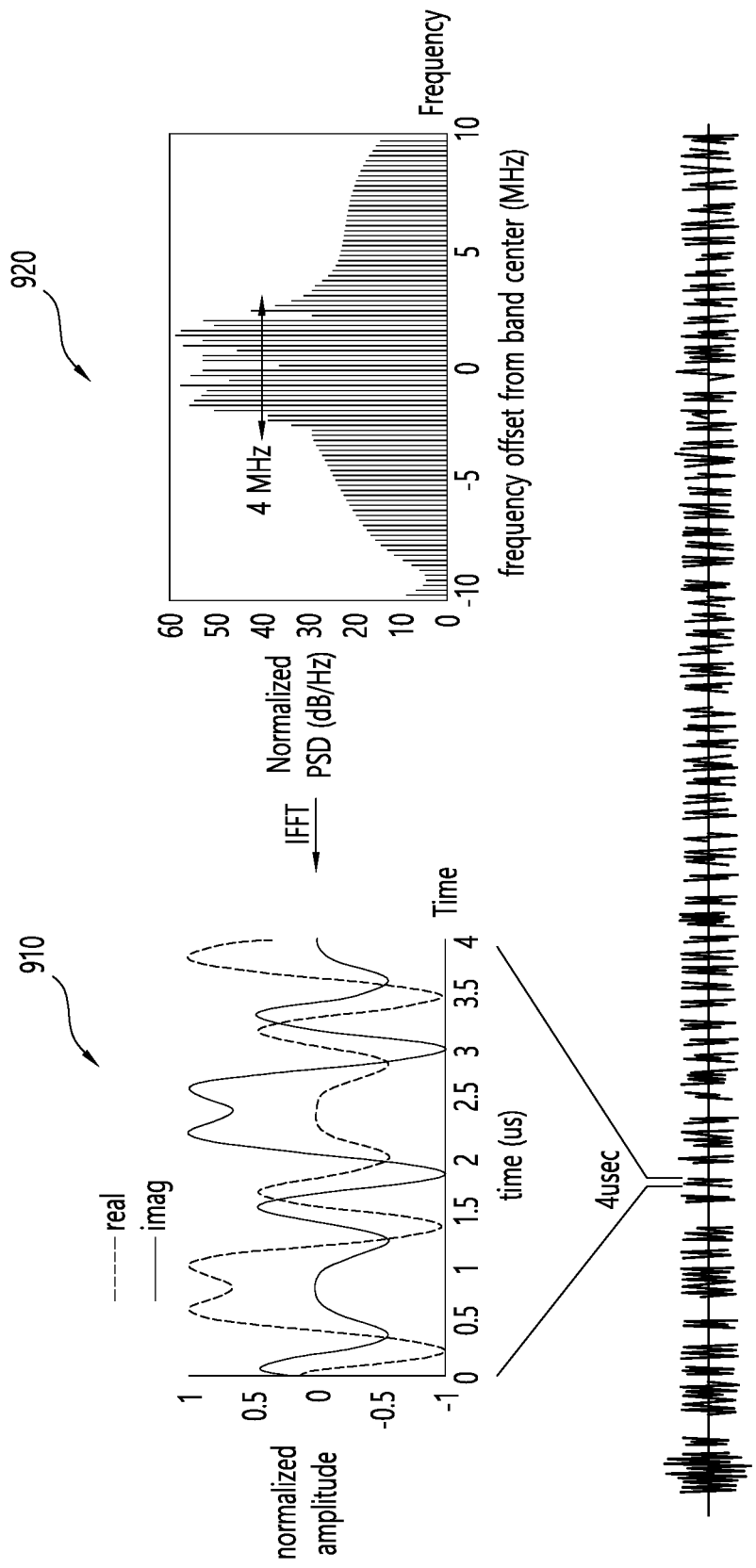
FIG. 9 illustrates a method for designing an OOK pulse according to an exemplary embodiment of this specification.

FIG. 9 illustrates a method for designing an OOK pulse according to an exemplary embodiment of this specification.

In order to generate an OOK pulse, an OFDM transmitting apparatus of 802.11 may be re-used. The transmitting apparatus may generate a sequence having 64 bits by applying 64-point FFT, just as in the legacy 802.11.

The transmitting apparatus should generate the payload of a wake-up packet by performing modulation using the OOK scheme. However, since the wake-up packet is used for low-power communication, the OOK scheme is applied to the ON-signal. Herein, the ON-signal is a signal having the actual power value, and an OFF-signal corresponds to a signal that does not have an actual power value. Although the OOK scheme is also applied to the OFF-signal, since the OFF-signal is not a signal that is generated using the transmitting apparatus, and, accordingly, since the signal is not actually transmitted, the OFF-signal is not considered when generating the wake-up packet.

In the OOK scheme, Information (bit) 1 may be the ON-signal, and Information (bit) 0 may be the OFF-signal. On the other hand, if the Manchester coding method is applied, it may be indicated that Information 1 is shifted from the OFF-signal to the ON-signal, and that Information 0 is shifted from the ON-signal to the OFF-signal. Conversely, it may also be indicated that Information 1 is shifted from the ON-signal to the OFF-signal, and that Information 0 is shifted from the OFF-signal to the ON-signal. The Manchester coding method will be described later on in detail.

Referring to FIG. 9, as shown in the right side frequency domain graph 920, the transmitting apparatus selects 13 consecutive subcarriers of the reference band, 20 MHz band, as a sample and applies a sequence. In FIG. 9, among the subcarriers of the 20 MHz band, the 13 subcarriers that are located in the middle are selected as the sample. More specifically, among the 64 subcarriers, the transmitting apparatus selects subcarriers having subcarriers indexes ranging from −6 to +6. In this case, since subcarrier index 0 is a DC subcarrier, this subcarrier may be nulled as 0. A specific sequence is configured only in the sample of the selected 13 subcarriers, and all of the remaining subcarriers excluding the 13 selected subcarriers (subcarrier indexes ranging from −32 to −7 and subcarrier indexes ranging from +7 to +31) are set to 0.

Additionally, since subcarrier spacing is 312.5 KHz, the 13 subcarriers have a channel bandwidth of approximately 4.06 MHz. More specifically, it may be understood that, in the 20 MHz band of the frequency domain, power exists only in 4.06 MHz. Thus, as described above, by focusing the power to the center, it will be advantageous in that a Signal to Noise Ratio (SNR) may be increased, and that power consumption in an AC/DC converter of the receiving apparatus may be reduced. Additionally, since the sampling frequency band is reduced to 4.06 MHz, the amount of the consumed power may be reduced accordingly.

Additionally, as shown in the left time domain graph (910), the transmitting apparatus performs 64-point IFFT on the 13 subcarriers, so as to generate one ON-signal in the time domain. One ON-signal has the size of 1 bit. More specifically, a sequence being configured of 13 subcarriers may correspond to 1 bit. Conversely, the transmitting apparatus may not transmit the OFF-signal at all. By performing IFFT, a symbol of 3.2 us may be generated, and, if a cyclic prefix (CP) (0.8 us) is included, one symbol having the length of 4 us may be generated. More specifically, 1 bit indicating one ON-signal may be loaded in one symbol.

The reason for configuring and transmitting a bit, as described in the above-described exemplary embodiment, is to reduce power consumption in the receiving apparatus using an envelope detector. Thus, the receiving apparatus may decode a packet with a minimum amount of power.

However, a basic data rate for one piece of information may be 125 Kbps (8 us) or 62.5 Kbps (16 us).

By generalizing the description presented above, a signal being transmitted from the frequency domain is as described below. More specifically, each signal having a length of K within the 20 MHz band may be transmitted by being loaded in K number of consecutive subcarriers, among the total of 64 subcarriers. More specifically, as a number of subcarriers being used for transmitting a signal, the value K may correspond to the bandwidth of an OOK pulse. Coefficients of subcarriers other than the K number of subcarriers are equal to 0. In this case, indexes of the K number of subcarriers being used by a signal corresponding to information 0 and information 1 are the same. For example, a subcarrier index that is being used may be indicated as 33-floor(K/2): 33+ceil(K/2)−1.

In this case, Information 1 and Information 0 may have the following values.

Information 0=zeros(1,K)
Information 1=alpha*ones(1,K)

The alpha is a power normalization factor and may, for example, be equal to 1/sqrt(K).

Figure 10:
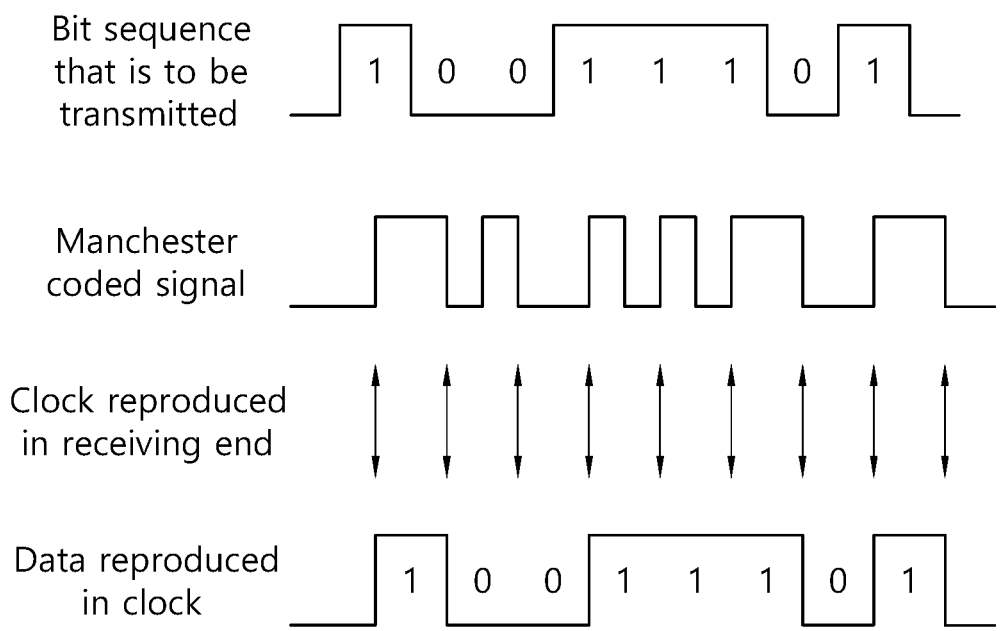
FIG. 10 is a descriptive diagram of a Manchester coding method according to an exemplary embodiment of this specification.

FIG. 10 is a descriptive diagram of a Manchester coding method according to an exemplary embodiment of this specification.

Manchester coding is a type of line coding that is a coding method in which a transition in a magnitude value occurs at a midpoint of one bit period. Furthermore, information of this method may be indicated as shown below in the following table.

TABLE 1

| Original data | | Clock | | Manchester value |
|---|---|---|---|---|
| 0 | = | 0 | XOR | 0 |
|   |   | 1 |   | 1 |
| 1 |   | 0 |   | 1 |
|   |   | 1 |   | 0 |

More specifically, the Manchester coding method (or technique) refers to a method of converting data from 1 to 01 and from 0 to 10 or from 1 to 10 and from 0 to 01. Table 1 shows an example of data being converted from 1 to 10 and from 0 to 01 using Manchester coding.

As shown in FIG. 10, from top to bottom, the drawing illustrates a bit sequence that is to be transmitted, a Manchester coded signal, a clock that is reproduced by the receiving end, and data that is reproduced by the clock.

If data is transmitted from the transmitting end using the Manchester coding method, the receiving end reads the data after a brief moment based on a transition point, wherein transition of 1→0 or 0→1 occurs. Then, after recovering the data and recognizing the transition point of transitioning 1→0 or 0→1 as the transition point of the block, the clock is recovered. Alternatively, when a symbol is divided based on the transition point, a simple decoding may be performed by comparing the power level of the front part of the symbol and the power level of the back part of the symbol based on the midpoint of the symbol.

As shown in FIG. 10, the bit sequence that is to be transmitted is 10011101, and the bit sequence that is to be transmitted being processed with Manchester coding is 0110100101011001, the clock that is reproduced in the receiving end recognizes a transition point of the Manchester-coded signal as the transition point of the block, and, then, data is recovered using the clock, which is reproduced as described above.

When using the above-described Manchester coding method, communication may be carried out in a synchronization method using only a data transmission channel and without using a separate clock.

Additionally, in the above-described, using only the data transmission channel, a TXD pin may be used for data transmission, and an RXD pin may be used for data reception. Therefore, a synchronized two-way transmission may be performed.

This specification proposes various symbol types that can be used in a WUR and the corresponding data rate.

Since STAs requiring robust performance (or capacity) and STAs receiving intense signals from an AP are intermixed, depending upon the situation, supporting an efficient data rate is needed. In order to achieve a reliable and robust performance, a symbol-based Manchester coding method and a symbol repetition method may be used. Additionally, in order to achieve a high data rate, a symbol reduction method may be used.

In this case, each symbol may be generated using the legacy 802.11 OFDM transmitter. Furthermore, the number of subcarriers that are used for generating each symbol may be equal to 13. However, the number of subcarriers will not be limited only to this.

Additionally, each symbol may use OOK modulation, which is configured of an ON-signal and an OFF-signal.

A symbol that is generated for the WUR may be configured of a cyclic prefix (CP) (or a guard interval (GI)) and a signal part indicating actual information. By variously configuring the lengths of the CP and the actual information signal, or by repeating the CP and the actual information part, a symbol having various data rates may be designed.

Various examples related to the symbol types are shown below.

For example, a basic WUR symbol may be indicated as CP+3.2 us. More specifically, 1 bit is indicated using a symbol having the same length as the legacy Wi-Fi. Most particularly, the transmitting apparatus performs IFFT after applying a specific sequence to all of the subcarriers that are available for usage (e.g., 13 subcarrier), thereby configuring an information signal part of 3.2 us. In this case, among all of the subcarriers that are available for usage, a coefficient of 0 may be loaded in a DC subcarrier or middle subcarrier index.

Different sequences may be applied to the subcarriers that are available for usage based on a 3.2 us ON-signal and a 3.2 us OFF-signal. The 3.2 us OFF-signal may be generated by applying 0s to all of the coefficients.

The CP may select and use a part having a specific length at an end part of the information signal 3.2 us that immediately follows the CP. In this case, the CP may be 0.4 us or 0.8 us. This length is the same length as the guard interval of 802.11ac.

Therefore, a piece of 1-bit information corresponding to one basic WUR symbol may be indicated as shown below in the following table.

TABLE 2

| Information "0" | Information "1" |
|---|---|
| 3.2 us OFF-signal | 3.2 us ON-signal |

Table 2 does not separately indicate the CP. Actually, when including the CP, CP+3.2 us may indicate one piece of 1-bit information. More specifically, the 3.2 us ON-signal may be regarded as a (CP+3.2 us) ON-signal, and the 3.2 us OFF-signal may be regarded as a (CP+3.2 us) OFF-signal.

For example, a symbol having Manchester coding applied thereto may be indicated as CP+1.6 us+CP+1.6 us or CP+1.6 us+1.6 us. The symbol having Manchester coding applied thereto may be generated as described below.

In an OOK transmission using a Wi-Fi transmitting apparatus, the time period used for transmitting one bit (or symbol) excluding the guard interval of the transmitted signal is equal to 3.2 us. In this case, if Manchester coding is also applied, a shift in the signal size (or magnitude) should occur in 1.6 us. More specifically, each sub-information having a length of 1.6 us should be given a value of 0 or 1, and the signal may be configured using the method described below.

Information 0->1 0 (Each may be referred to as sub-information 1 0 or sub-symbol 1 (ON) 0 (OFF).)

First 1.6 us (sub-information 1 or sub-symbol 1): Sub-information 1 may be given a value of beta*ones(1,K).

Herein, the beta indicates a power normalization element and may, for example, be equal to 1/sqrt(ceil(K/2)).

Additionally, in order to generate the symbol having Manchester coding applied thereto, a specific sequence is applied to all subcarriers that are available for usage (e.g., 13 subcarriers) in units of 2 spaces. More specifically, each even-number indexed subcarrier of the specific pattern is nulled using 0. For example, when it is assumed that an ON-signal is configured using 13 subcarriers, the specific sequence having a coefficient at an interval of 2 spaces may be {a 0 b 0 c 0 d 0 e 0 f 0 g}, {0 a 0 b 0 c 0 d 0 e 0 f 0}, or {a 0 b 0 c 0 0 0 d 0 e 0 f}. In this case, a, b, c, d, e, f, g may be equal to 1 or −1.

More specifically, among the 64 subcarriers, the transmitting apparatus maps the specific sequence to K number of consecutive subcarriers (e.g., 33-floor(K/2): 33+ceil(K/2)−1) and sets a coefficient of 0 for the remaining subcarriers. Thereafter, the transmitting apparatus performs IFFT. Thus, a time domain signal may be generated. Since the time domain signals has coefficients existing at an interval of 2 spaces within the frequency domain, the time domain signal is a 3.2 us-length signal of having a cycle of 1.6 us. One of a first 1.6 us-cycle signal and a second 1.6 us-cycle signal may be selected and used as sub-information 1.

Second 1.6 us (sub-information 0 or sub-symbol 0): Sub-information 0 may be given a value of zeros(1,K). Similarly, among the 64 subcarriers, the transmitting apparatus maps the specific sequence to K number of consecutive subcarriers (e.g., 33-floor(K/2): 33+ceil(K/2)−1) and performs IFFT, thereby generating a time domain signal. Sub-information 0 may correspond to a 1.6 us OFF-signal. The 1.6 us OFF-signal may be generated by setting all of the coefficients to 0.

One of a first 1.6 us-cycle signal and a second 1.6 us-cycle signal of the time domain may be selected and used as sub-information 0. Simply, zero signals (1,32) may also be used as sub-information 0.

Information 1->0 1 (Each may be referred to as sub-information "0", "1" or sub-symbol 0 (OFF) 1 (ON).)

Since Information 1 is also divided into a first 1.6 us (sub-information 0) and a second 1.6 us (sub-information 1), a signal corresponding to each sub-information may be configured using the same method as the method for generating Information 0.

When performing the method for generating Information 0 and Information 1 using Manchester coding, a consecutive occurrence of OFF-symbols may be prevented as compared to the legacy method. Accordingly, a problem of coexistence with the legacy Wi-Fi device does not occur. The problem of coexistence refers to a problem that occurs when another device transmits a signal after determining that the channel is in a channel idle state, due to the existence of consecutive OFF-symbols. If the OOK modulation is only used, the sequence may, for example, be 100001, wherein the OFF-symbol occurs consecutively. However, if Manchester coding is used, the sequence may be 100101010110, wherein the OFF-symbols cannot be consecutive.

According to the description provided above, the sub-information may be referred to as a 1.6 us information signal. The 1.6 us information signal may be a 1.6 us ON-signal or a 1.6 us OFF-signal. The 1.6 us ON-signal and the 1.6 us OFF-signal may have different sequences applied thereto in each subcarrier.

The CP may select and use a part corresponding having a specific length at an end part of the information signal 1.6 us that immediately follows the CP. In this case, the CP may be 0.4 us or 0.8 us. This length is the same length as the guard interval of 802.11ac.

Therefore, a piece of 1-bit information corresponding to a symbol having Manchester coding applied thereto may be indicated as shown below in the following table.

TABLE 3

| Information "0" | Information "1" |
|---|---|
| 1.6 us ON-signal + 1.6 us OFF-signal or 1.6 us OFF-signal + 1.6 us ON-signal | 1.6 us OFF-signal + 1.6 us ON-signal or 1.6 us ON-signal + 1.6 us OFF-signal |

Table 3 does not separately indicate the CP. Actually, when including the CP, CP+1.6 us+CP+1.6 us or CP+1.6 us+1.6 us may indicate one piece of 1-bit information. More specifically, in case of the former structure, the 1.6 us ON-signal and the 1.6 us OFF-signal may be respectively regarded as a (CP+1.6 us) ON-signal and a (CP+1.6 us) OFF-signal.

As yet another example, proposed herein is a method for generating a wake-up packet by repeating symbols in order to enhance performance.

A symbol repetition method is applied to a wake-up payload (724). The symbol repetition method refers to a repetition of time signals after IFFT and cyclic prefix (CP) insertion in each symbol. Thus, the length (time (or duration)) of the wake-up payload (724) becomes two times its initial length.

More specifically, a method for generating a wake-up packet by applying a symbol, which indicates information such as Information 0 or Information 1, to a specific sequence and by repeating this process is proposed as described below.

Option 1: Information 0 and Information 1 may be indicated by being repeated as the same symbol.
Information 0->0 0 (Information 0 is repeated 2 times)
Information 1->1 1 (Information 1 is repeated 2 times)
Option 2: Information 0 and Information 1 may be indicated by being repeated as different symbols.
Information 0->0 1 or 1 0 (Information 0 and Information 1 are repeated)
Information 1->1 0 or 0 1 (Information 1 and Information 0 are repeated)

Hereinafter, a method of decoding a signal, by a receiving apparatus, being transmitted from a transmitting apparatus after applying the symbol repetition method will be described in detail.

The transmitted signal may correspond to a wake-up packet, and a method for decoding the wake-up packet may be broadly divided into two different types. A first type is a non-coherent detection method, and a second type is a coherent detection method. The non-coherent detection method refers to a method wherein a phase relation between signals of the transmitting apparatus and the receiving apparatus is not fixed. Therefore, the receiving apparatus is not required to measure and adjust the phase of the received signal. Conversely, in the coherent detection method, the phase between the signals of the transmitting apparatus and the receiving apparatus is required to be matched.

The receiving apparatus includes the above-described low-power wake-up receiver. In order to reduce power consumption, the low-power wake-up receiver may decode a packet (wake-up packet), which is transmitted using the OOK modulation scheme, using an envelope detector.

The envelope detector uses a method of decoding a received signal by measuring the power or magnitude of the corresponding signal. The receiving apparatus determines in advance a threshold value based on the power or magnitude of the received signal, which is measured using the envelope detector. Thereafter, when the receiving apparatus decodes the symbol having OOK applied thereto, if the symbol is greater than or equal to the threshold value, the symbol is determined as Information 1, and, if the symbol is smaller than the threshold value, the symbol is determined as Information 0.

A method for decoding a symbol having the symbol repetition method applied thereto is as described below. In the above-described Option 1, the receiving apparatus may calculate the power corresponding to a case where Symbol 1 (symbol including Information 1) is transmitted using a wake-up preamble 722 and may use the calculated power to determine a threshold value.

More specifically, when an average power level between two symbols is calculated, if the calculated average power level is equal to or greater than the threshold value, the symbol is determined as Information 1 (1 1). Furthermore, if the calculated average power level is equal to or smaller than the threshold value, the symbol is determined as Information 0 (0 0).

Additionally, in Option 2, the information may be determined by comparing the power levels of the two symbols without performing the process of determining the threshold value.

More specifically, when it is given that Information 1 is configured of 0 1 and that Information 0 is configured of 1 0, if the power level of a first symbol is greater than the power level of a second symbol, the information is determined as Information 0. Conversely, if the power level of the first symbol is smaller than the power level of the second symbol, the information is determined as Information 1.

The order of the symbols may be reconfigured by the interleaver. Herein, the interleaver may be applied in packet units and units of a specific number of symbols.

Figure 11:
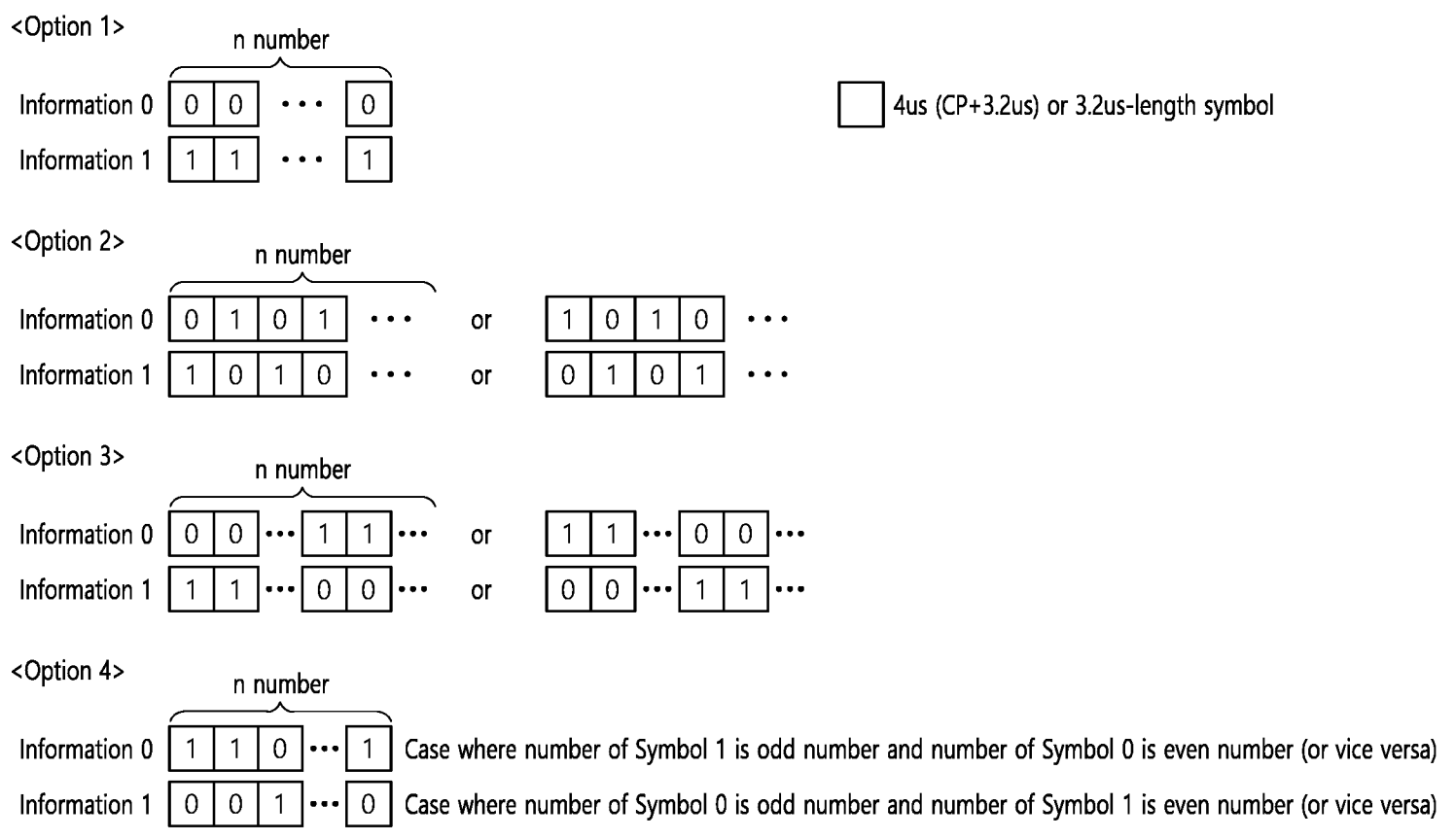

Moreover, in addition to two symbols, the symbol repetition may be extended using n number of symbols, as described below. FIG. 11 illustrates various examples of a symbol repetition method repeating n number of symbols according to an exemplary embodiment of this specification.

Option 1: As described in FIG. 11, Information 0 and Information 1 may be indicated by being repeated n number of times as the same symbol.
Information 0->0 0 . . . 0 (Information 0 is repeated n number of times)
Information 1->1 1 . . . 1 (Information 1 is repeated n number of times)

Option 2: As described in FIG. 11, Information 0 and Information 1 may be indicated by being repeated n number of times as different symbols.
Information 0->0 1 0 1 . . . or 1 0 1 0 . . . (Information 0 and Information 1 are alternately repeated n number of times)
Information 1->1 0 1 0 . . . or 0 1 0 1 . . . (Information 1 and Information 0 are alternately repeated n number of times)

Option 3: As described in FIG. 11, n number of symbols may be indicated by configuring one half of the symbols of Information 0 and by configuring another half of the symbols of Information 1.

Information 0->0 0 . . . 1 1 . . . or 1 1 . . . 0 0 . . . (n/2 number of symbols is configured of Information 0, and the remaining n number of symbols is configured of Information 1)
Information 1->1 1 . . . 0 0 . . . or 0 0 . . . 1 1 . . . (n/2 number of symbols is configured of Information 0, and the remaining n number of symbols is configured of Information 1)

Option 4: As described in FIG. 11, when n is an odd number, a total of n number of symbols may be indicated by differentiating a number of Symbol 1's (symbol including Information 1) and a number of Symbol 0's (symbols including Information 0) from one another.

Information 0->n number of symbols configured of an odd number of Symbol 1's and an even number of Symbol 0's, or n number of symbols configured of an even number of Symbol 1's and an odd number of Symbol 0's
Information 1->n number of symbols configured of an odd number of Symbol 0's and an even number of Symbol 1's, or n number of symbols configured of an even number of Symbol 0's and an odd number of Symbol 1's Additionally, the order of the symbols may be reconfigured by the interleaver. Herein, the interleaver may be applied in packet units and units of a specific number of symbols.

Moreover, as described above, the receiving apparatus may determine the symbol (or information) as Information 0 or Information 1 by determining the threshold value and comparing the power levels of n number of symbols.

However, if consecutive Symbol 0's (or OFF-signals) are used, a problem of coexistence with the legacy Wi-Fi device and/or another device may occur. The problem of coexistence refers to a problem that occurs when another device transmits a signal after determining that the channel is in a channel idle state, due to the existence of consecutive OFF-symbols. Therefore, in order to resolve the problem of coexistence, since it is preferable to avoid the usage of consecutive OFF-signals, the method proposed in Option 2 may be preferred.

Additionally, this may be extended to a method of expressing m number of inion sets using n number of symbols. In this case, the first or last m number of information sets may be indicated as symbols 0 (OFF) or 1 (ON) based on the corresponding information sets, and n-m number of redundant symbols 0 (OFF) or 1 (ON) may be consecutively configured after or before the first or last m number of information sets.

For example, if a code rate of 3/4 is applied to information 010, the information may be 1,010 or 010,1 or 0,010 or 010,0. However, in order to prevent the usage of consecutive OFF symbols, it may be preferable to apply a code rate of 1/2 or less.

Similarly, in this exemplary embodiment, the order of the symbols may be reconfigured by an interleaver. Herein, the interleaver may be applied in packet units and units of a specific number of symbols.

Hereinafter, various exemplary embodiments of a symbol having the symbol repetition method applied thereto will be described in detail.

In general, a symbol having the symbol repetition method applied thereto may be indicated as n number of (CP+3.2 us) or CP+n number of (1.6 us).

As shown in FIG. 11, 1 bit is indicated using n (n>=2) number of information signals (symbols), and, after applying a specific sequence to all of the subcarriers that are available for usage (e.g., 13 subcarriers), IFFT is performed so as to configure an information signal (symbol) of 3.2 us.

Different sequences may be applied to subcarriers that are available for usage based on a 3.2 us ON-signal and a 3.2 us OFF-signal. The 3.2 us OFF-signal may be generated by applying 0s to all of the coefficients.

A CP may select and use a part having a specific length at an end part of the information signal 3.2 us that immediately follows the CP. In this case, the CP may be equal to 0.4 us or 0.8 us. This length is the same length as the guard interval of 802.11ac.

Therefore, a piece of 1-bit information corresponding to a general symbol having the symbol repetition method applied thereto may be indicated as shown below in the following table.

TABLE 4

| Information "0" | Information "1" |
|---|---|
| All 3.2 us OFF-signals or two specific consecutive signals are 3.2 us ON-signal + 3.2 us OFF-signal, and the remaining signals are all ON or all OFF or two specific consecutive signals are 3.2 us OFF-signal + 3.2 us ON-signal, and the remaining signals are all ON or all OFF or a specific number (or ceil(n/2) number or floor(n/2) number) of signals located at specific positions are 3.2 us OFF-signals, and the remaining signals are 3.2 us ON-signals Ex) ON + OFF + ON + OFF . . . | All 3.2 us ON-signals or two specific consecutive signals are 3.2 us OFF-signal + 3.2 us ON-signal, and the remaining signals are all ON or all OFF or two specific consecutive signals are3.2 us ON-signal + 3.2 us OFF-signal, and the remaining signals are all ON or all OFF or a specific number (or ceil(n/2) number or floor (n/2) number) of signals located at specific positions are 3.2 us ON-signals, and the remaining signals are 3.2 us OFF-signals Ex) OFF+ ON + OFF + ON + OFF . . . |

Table 4 does not separately indicate the CP. Actually, when including the CP, n number of (CP+3.2 us) or CP+n number of (3.2 us) may indicate one piece of 1-bit information. More specifically, in case of then number of (CP+ 3.2 us), the 3.2 us ON-signal may be regarded as a (CP+3.2 us) ON-signal, and the 3.2 us OFF-signal may be regarded as a (CP+3.2 us) OFF-signal.

As another example, a symbol having the symbol repetition method applied thereto may be indicated as CP+3.2 us+CP+3.2 us or CP+3.2 us+3.2 us.

According to this exemplary embodiment, 1 bit is indicated using two information signals (symbols), and, after applying a specific sequence to all of the subcarriers that are available for usage (e.g., 13 subcarriers), IFFT is performed so as to configure an information signal (symbol) of 3.2 us.

Different sequences may be applied to the subcarriers that are available for usage based on a 3.2 us ON-signal and a 3.2 us OFF-signal. The 3.2 us OFF-signal may be generated by applying 0s to all of the coefficients.

The CP may select and use a part having a specific length at an end part of the information signal 3.2 us that immediately follows the CP. In this case, the CP may be equal to 0.4 us or 0.8 us. This length may be the same length as the guard interval of 802.11ac.

Therefore, a piece of 1-bit information corresponding to a symbol having the symbol repetition method applied thereto may be indicated as shown below in the following table.

TABLE 5

| Information "0" | Information "1" |
|---|---|
| 3.2 us OFF-signal + 3.2 us OFF-signal or 3.2 us ON-signal + 3.2 us OFF-signal or 3.2 us OFF-signal + 3.2 us ON-signal | 3.2 us ON-signal + 3.2 us ON-signal or 3.2 us OFF-signal + 3.2 us ON-signal or 3.2 us ON-signal + 3.2 us OFF-signal |

Table 5 does not separately indicate the CP. Actually, when including the CP, CP+3.2 us+CP+3.2 us or CP+3.2 us+3.2 us may indicate one piece of 1-bit information. More specifically, in case of CP+3.2 us+CP+3.2 us, the 3.2 us ON-signal may be regarded as a (CP+3.2 us) ON-signal, and the 3.2 us OFF-signal may be regarded as a (CP+3.2 us) OFF-signal.

As yet another example, a symbol having the symbol repetition method applied thereto may be indicated as CP+3.2 us+CP+3.2 us+CP+3.2 us or CP+3.2 us+3.2 us+3.2 us.

According to this exemplary embodiment, 1 bit is indicated using three information signals (symbols), and, after applying a specific sequence to all of the subcarriers that are available for usage (e.g., 13 subcarriers), IFFT is performed so as to configure an information signal (symbol) of 3.2 us.

Different sequences may be applied to the subcarriers that are available for usage based on a 3.2 us ON-signal and a 3.2 us OFF-signal. The 3.2 us OFF-signal may be generated by applying 0s to all of the coefficients.

The CP may select and use a part having a specific length at an end part of the information signal 3.2 us that immediately follows the CP. In this case, the CP may be equal to 0.4 us or 0.8 us. This length may be the same length as the guard interval of 802.11ac.

Therefore, a piece of 1-bit information corresponding to a symbol having the symbol repetition method applied thereto may be indicated as shown below in the following table.

TABLE 6

| Information "0" | Information "1" |
|---|---|
| 3.2 us OFF-signal + 3.2 us OFF-signal + 3.2 us OFF-signal or 3.2 us ON-signal + 3.2 us ON-signal + 3.2 us OFF-signal or 3.2 us ON-signal + 3.2 us OFF-signal + 3.2 us ON-signal or 3.2 us OFF-signal + 3.2 us ON-signal + 3.2 us ON-signal | 3.2 us ON-signal + 3.2 us ON-signal + 3.2 us ON-signal or 3.2 us ON-signal + 3.2 us OFF-signal + 3.2 us ON-signal or 3.2 us ON-signal + 3.2 us ON-signal + 3.2 us OFF-signal or 3.2 us OFF-signal + 3.2 us ON-signal + 3.2 us OFF-signal |

Table 6 does not separately indicate the CP. Actually, when including the CP, CP+3.2 us+CP+3.2 us+CP+3.2 us or CP+3.2 us+3.2 us+3.2 us may indicate one piece of 1-bit information. More specifically, in case of CP+3.2 us+CP+ 3.2 us+CP+3.2 us, the 3.2 us ON-signal may be regarded as a (CP+3.2 us) ON-signal, and the 3.2 us OFF-signal may be regarded as a (CP+3.2 us) OFF-signal.

As yet another example, a symbol having the symbol repetition method applied thereto may be indicated as CP+3.2 us+CP+3.2 us+CP+3.2 us+CP+3.2 us or CP+3.2 us+3.2 us+3.2 us+3.2 us.

According to this exemplary embodiment, 1 bit is indicated using four information signals (symbols), and, after applying a specific sequence to all of the subcarriers that are available for usage (e.g., 13 subcarriers), IFFT is performed so as to configure an information signal (symbol) of 3.2 us.

Different sequences may be applied to the subcarriers that are available for usage based on a 3.2 us ON-signal and a 3.2 us OFF-signal. The 3.2 us OFF-signal may be generated by applying 0s to all of the coefficients.

The CP may select and use a part having a specific length at an end part of the information signal 3.2 us that immediately follows the CP. In this case, the CP may be equal to 0.4 us or 0.8 us. This length may be the same length as the guard interval of 802.11ac.

Therefore, a piece of 1-bit information corresponding to a symbol having the symbol repetition method applied thereto may be indicated as shown below in the following table.

As yet another example, a symbol having Manchester coding applied thereto may be indicated as n number of (CP+1.6 us+CP+1.6 us) or CP+n number of (1.6 us+1.6 us).

According to this exemplary embodiment, 1 bit is indicated by a symbol that is repeated n (n>=2) number of times, and, after applying a specific sequence to all of the subcarriers that are available for usage (e.g., 13 subcarriers) and setting a coefficient of 0 for the remaining subcarriers, IFFT is performed so as to generate a signal (symbol) of 3.2 us having a cycle of 1.6 us. Herein, one of the configured signals is selected and set (or configured) as a 1.6 us information signal (symbol).

A sub-information may be referred to as a 1.6 us information signal. The 1.6 us information signal may be a 1.6 us ON-signal or a 1.6 us OFF-signal. The 1.6 us ON-signal and the 1.6 us OFF-signal may have different sequences applied thereto in each subcarrier. The 1.6 us OFF-signal may be generated by applying 0s to all of the coefficients.

TABLE 7

| Information "0" | Information "1" |
| --- | --- |
| 3.2 us OFF-signal + 3.2 us OFF-signal + 3.2 us OFF-signal + 3.2 us OFF-signal or 3.2 us ON-signal + 3.2 us ON-signal + 3.2 us ON-signal + 3.2 us OFF-signal or 3.2 us ON-signal + 3.2 us ON-signal + 3.2 us OFF-signal + 3.2 us ON-signal or 3.2 us ON-signal + 3.2 us ON-signal + 3.2 us OFF-signal + 3.2 us ON-signal or 3.2 us ON-signal + 3.2 us OFF-signal + 3.2 us ON-signal + 3.2 us ON-signal or 3.2 us ON-signal + 3.2 us OFF-signal + 3.2 us ON-signal + 3.2 us OFF-signal or 3.2 us ON-signal + 3.2 us ON-signal + 3.2 us OFF-signal + 3.2 us OFF-signal or 3.2 us OFF-signal + 3.2 us OFF-signal + 3.2 us ON-signal + 3.2 us ON-signal | 3.2 us ON-signal + 3.2 us ON-signal + 3.2 us ON-signal + 3.2 us ON-signal or 3.2 us ON-signal + 3.2 us ON-signal + 3.2 us OFF-signal + 3.2 us ON-signal or 3.2 us ON-signal + 3.2 us ON-signal + 3.2 us ON-signal + 3.2 us OFF-signal or 3.2 us ON-signal + 3.2 us OFF-signal + 3.2 us ON-signal + 3.2 us ON-signal or 3.2 us OFF-signal + 3.2 us ON-signal + 3.2 us ON-signal + 3.2 us ON-signal or 3.2 us OFF-signal + 3.2 us OFF-signal + 3.2 us ON-signal + 3.2 us ON-signal or 3.2 us ON-signal + 3.2 us ON-signal + 3.2 us OFF-signal + 3.2 us OFF-signal |

Table 7 does not separately indicate the CP. Actually, when including the CP, CP+3.2 us+CP+3.2 us+CP+3.2 us+CP+3.2 us or CP+3.2 us+3.2 us+3.2 us+3.2 us may indicate one piece of 1-bit information. More specifically, in case of CP+3.2 us+CP+3.2 us+CP+3.2 us+CP+3.2 us, the 3.2 us ON-signal may be regarded as a (CP+3.2 us) ON-signal, and the 3.2 us OFF-signal may be regarded as a (CP+3.2 us) OFF-signal.

The CP may select and use a part having a specific length at an end part of the information signal 1.6 us that immediately follows the CP. In this case, the CP may be equal to 0.4 us or 0.8 us. This length may be the same length as the guard interval of 802.11ac.

Therefore, a piece of 1-bit information corresponding to a symbol having Manchester coding applied thereto based on symbol repetition may be indicated as shown below in the following table.

TABLE 8

| Information "0" | Information "1" |
| --- | --- |
| (1.6 us ON-signal + 1.6 us OFF-signal) is repeated n number of times or (1.6 us OFF-signal + 1.6 us ON-signal) is repeated n number of times (1.6 us ON-signal + 1.6 us OFF-signal) + (1.6 us OFF-signal + 1.6 us ON-signal) is repeated floor(n/2) number of times + (1.6 us ON-signal + 1.6 us OFF-signal) when needed (1.6 us OFF-signal + 1.6 us ON-signal) + (1.6 us ON-signal + 1.6 us OFF-signal) is repeated floor(n/2) number of times + (1.6 us OFF-signal + 1.6 us ON-signal) when needed | (1.6 us OFF-signal + 1.6 us ON-signal) is repeated n number of times or (1.6 us ON-signal + 1.6 us OFF-signal) is repeated n number of times (1.6 us OFF-signal + 1.6 us ON-signal) + (1.6 us ON-signal + 1.6 us OFF-signal) is repeated floor(n/2) number of times + (1.6 us OFF-signal + 1.6 us ON-signal) when needed (1.6 us ON-signal + 1.6 us OFF-signal) + (1.6 us OFF-signal + 1.6 us ON-signal) is repeated floor(n/2) number of times + (1.6 us ON-signal + 1.6 us OFF-signal) when needed |

Table 8 does not separately indicate the CP. Actually, when including the CP, n number of (CP+1.6 us+CP+1.6 us) or CP+n number of (1.6 us+1.6 us) may indicate one piece of 1-bit information. More specifically, in case of the n number of (CP+1.6 us+CP+1.6 us), the 1.6 us ON-signal may be regarded as a (CP+1.6 us) ON-signal, and the 1.6 us OFF-signal may be regarded as a (CP+1.6 us) OFF-signal.

As shown in the above-described exemplary embodiments, using the symbol repetition method, the range requirement of the low-power wake-up communication may be satisfied. In case of applying only the OOK scheme, the data rate for one symbol is 250 Kbps (4 us). In this case, if the symbol is repeated 2 times using the symbol repetition method, the data rate may become 125 Kbps (8 us), and, if the symbol is repeated 4 times, the data rate may become 62.5 Kbps (16 us), and, if the symbol is repeated 8 times, the data rate may become 31.25 Kbps (32 us). In case of the low-power communication, if the BCC does not exist, the symbol should be repeated 8 times in order to satisfy the range requirement.

Hereinafter, various embodiments of a symbol being applied to a symbol reduction scheme among symbol types that can be used for a WUR will be described.

Figure 12:
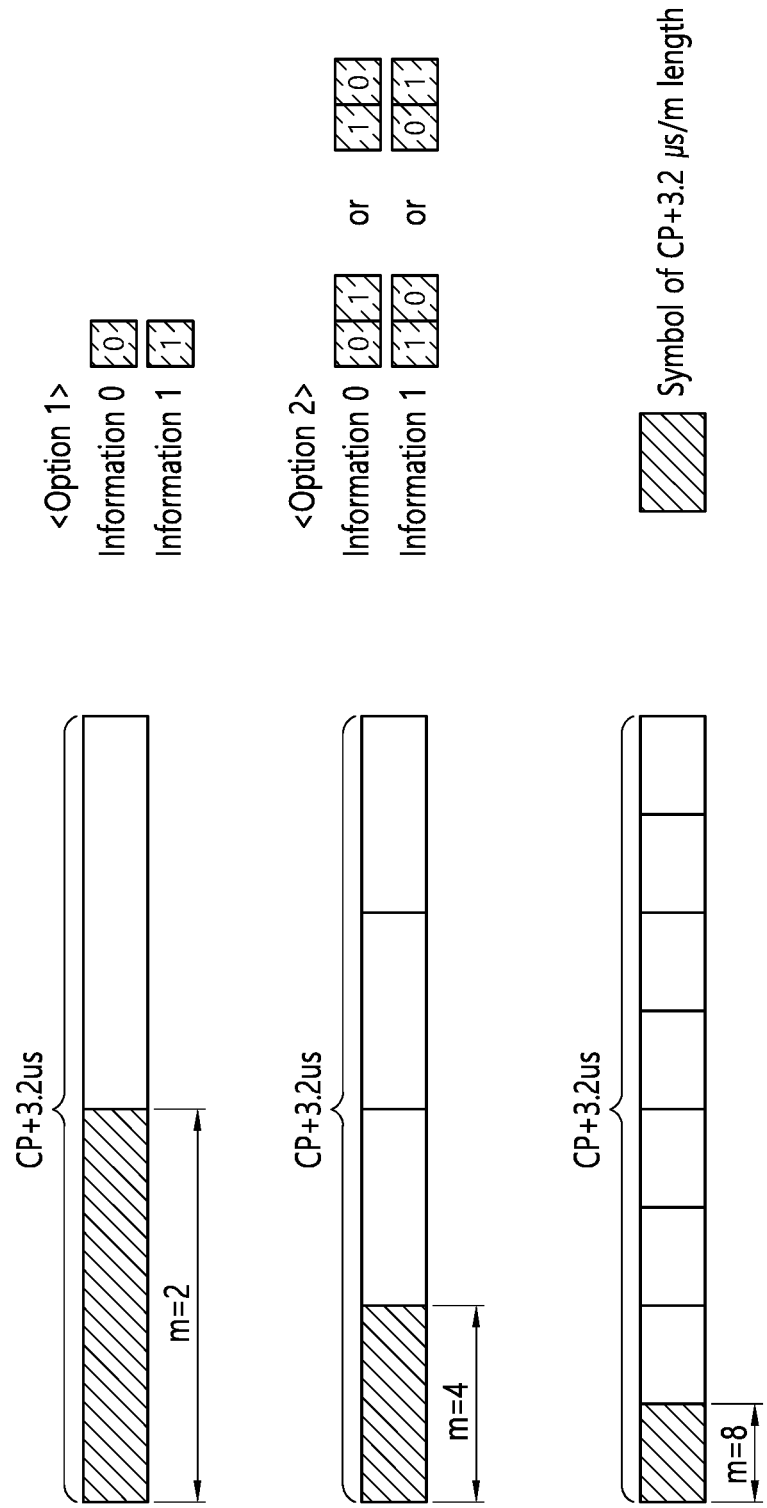
FIG. 12 shows various examples of a symbol reduction scheme according to an embodiment.

FIG. 12 shows various examples of a symbol reduction scheme according to an embodiment.

According to the embodiment of FIG. 12, as m increases, a symbol is reduced, and accordingly the length of a symbol carrying one piece of information is reduced. When m=2, the length of a symbol carrying one piece of information is CP+1.6 us. When m=4, the length of a symbol carrying one piece of information is CP+0.8 us. When m=8, the length of a symbol carrying one piece of information is CP+0.4 us.

The shorter a symbol length is, a higher data rate may be obtained. When only OOK is applied, a data rate for one symbol is 250 Kbps (4 us). In a case where a symbol reduction scheme is applied: when m=2, the data rate may be 500 Kbps (2 us); when m=4, the data rate may be 1 Mbps (1 us); when m=8, the data rate may be 2 Mbps (0.5 us).

For example, a symbol to which a symbol reduction scheme is applied may be represented as CP+3.2 us/m (m=2, 4, 8, 16, 32, . . . ) (Option 1).

As in Option 1 of FIG. 12, one bit is represented using a symbol to which a symbol reduction scheme is applied, a particular sequence is applied to all available subcarriers (for example, 13 subcarriers) by a unit of m subcarriers, and a coefficient of 0 is set for the remaining subcarriers. Then, IFFT is performed on the subcarriers to which the particular sequence is applied, thereby generating 3.2 us signals having a period of 3.2 us/m, one of which is mapped to a 3.2 us/m information signal (information 1).

For example, when a particular sequence is applied to 13 subcarriers by a unit of two subcarriers (m=2), an on signal may be configured as follows.

On signal(information 1): {a 0 b 0 c 0 d 0 e 0 f 0 g} or {0 a 0 b 0 c 0 d 0 e 0 f 0}, where a, b, c, d, e, f, and g are 1 or −1.

In another example, when a particular sequence is applied to 13 subcarriers by a unit of four subcarriers (m=4), an on signal may be configured as follows.

On signal(information 1): {a 0 0 0 b 0 0 0 c 0 0 0 d}, {0 a 0 0 0 b 0 0 0 c 0 0 0}, {0 0 a 0 0 0 b 0 0 0 c 0 0}, {0 0 0a 0 0 0 b 0 0 0 c 0}, or {0 0 a 0 0 0 0 0 0 0 b 0 0}, where a, b, c, and d are 1 or −1.

In still another example, when a particular sequence is applied to 13 subcarriers by a unit of eight subcarriers (m=8), an on signal may be configured as follows.

On signal (information 1): {a 0 0 0 0 0 0 0 b 0 0 0 0}, {0 a 0 0 0 0 0 0 0 b 0 0 0}, {0 0 a 0 0 0 0 0 0 0 b 0 0}, {0 0 0 a 0 0 0 0 0 0 0 b 0}, or {0 0 0 0 a 0 0 0 0 0 0 0 b}, where a and b is 1 or −1.

A 3.2 us/m information signal is divided into a 3.2 us/m on signal and a 3.2 us/m off signal. Different sequences may be applied to (available) subcarriers for the 3.2 us/m on signal and the 3.2 us/m off signal. The 3.2 us/m off signal may be generated by applying 0 to all coefficients.

A CP may be used by adopting a specified length of the following 3.2 us/m information signal from the back. Here, the CP may be 0.4 us or 0.8 us. This length is the same as the length of a guard interval in 802.11ac. However, when m=8, the CP cannot be 0.8 us. Alternatively, the CP may be 0.1 us or 0.2 us and may be a different value.

Therefore, one-bit information corresponding to a symbol to which a general symbol reduction scheme is applied may be represented as in the following table.

TABLE 9

| Information 0 | Information 1 |
| --- | --- |
| 3.2 us/m OFF-signal | 3.2 us/m ON-signal |

In Table 9, a CP is not indicated. Actually, CP+3.2 us/m including a CP may indicate one one-bit information. That is, the 3.2 us/m on signal may be considered as a CP+3.2 us/m on signal, and the 3.2 us/m off signal may be considered as a CP+3.2 us/m off signal.

In another example, a symbol to which a symbol reduction scheme is applied may be represented as CP+3.2 us/m+CP+3.2 us/m (m=2, 4, 8) (Option 2).

In OOK transmission using a Wi-Fi transmission device, the time used to transmit one bit (or symbol) excluding a guard interval of a transmission signal is 3.2 us. Here, when a symbol reduction scheme is applied, the time used to transmit one bit is 3.2 us/m. However, in this embodiment, the time used to transmit one bit is set to 3.2 us/m+3.2 us/m by repeating a symbol to which the symbol reduction scheme is applied, and transition in signal size between 3.2 us/m signals is allowed to occur using characteristics of Manchester coding. That is, each piece of sub-information having a length of 3.2 us/m needs to have a value of 0 or 1, and a signal may be configured as follows.

Information 0->1 0 (each may be called sub-information 1 or 0, or sub-symbol 1 (ON) or 0 (OFF))

First 3.2 us/m signal (sub-information 1 or sub-symbol 1): A particular sequence is applied by a unit of m spaces to all subcarriers (for example, 13 subcarriers) available to generate a symbol to which a symbol reduction scheme is applied. That is, the particular sequence may have a coefficient at intervals of m spaces.

The transmission device maps particular sequences to K consecutive subcarriers among 64 subcarriers, sets a coefficient of 0 for the remaining subcarriers, and performs IFFT the subcarriers. Accordingly, a time-domain signal may be generated. Since the time-domain signal has a coefficient at intervals of m spaces in the frequency domain, a 3.2 us signal having a period of 3.2 us/m is generated. One of these signals may be adopted and used as a 3.2 us/m on signal (sub-information 1).

Second 3.2 us/m signal (sub-information 0 or sub-symbol 0): Similarly to the first 3.2 us/m signal, the transmission device may map particular sequences to K consecutive subcarriers among 64 subcarriers and may perform IFFT thereon, thereby generating a time-domain signal. Sub-information 0 may correspond to a 3.2 us/m off signal. The 3.2 us/m off signal may be generated by setting all coefficients to 0.

One of the first and second 3.2 us/m periodic signals of the time-domain signals may be selected and used as sub-information 0.

Information 1->0 1 (each may be called sub-information 0 or 1, or sub-symbol 0 (OFF) or 1 (ON))

Since information 1 is also divided into a first 3.2 us/m signal (sub-information 0) and a second 3.2 us/m signal (sub-information 1), a signal corresponding to each sub-information may be configured in the same manner as used for generating information 0.

Information 0 may be configured as 01, and information 1 may be configured as 10.

As in Option 2 of FIG. 12, one-bit information corresponding to a symbol to which a symbol reduction scheme is applied may be represented as in the following table.

TABLE 10

| Information 0 | Information 1 |
|---|---|
| 3.2 us/m OFF-signal + 3.2 us/m ON-signal or 3.2 us/m ON-signal + 3.2 us/m OFF-signal | 3.2 us/m ON-signal + 3.2 us/m OFF-signal or 3.2 us/m OFF-signal + 3.2 us/m ON-signal |

In Table 10, the CP is not indicated. Actually, CP+3.2 us/m including the CP may indicate one one-bit information. That is, the 3.2 us/m on signal may be considered as a CP+3.2 us/m on signal, and the 3.2 us/m off signal may be considered as a CP+3.2 us/m off signal.

Embodiments of Option 1 and Option 2 in FIG. 12 may be generalized as in the following table.

TABLE 11

| | Information 0 | Information 1 |
|---|---|---|
| Option 1 (m = 2, 4, 8) | 2 us OFF-signal<br>1 us OFF-signal<br>0.5 us OFF-signal | 2 us ON-signal<br>1 us ON-signal<br>0.5 us ON-signal |
| Option 2 (m = 4, 8) | 1 us OFF-signal + 1 us ON-signal or<br>1 us ON-signal + 1 us OFF-signal<br>0.5 OFF-signal + 0.5 us ON-signal or<br>0.5 us ON-signal + 0.5 us OFF-signal | 1 us ON-signal + 1 us OFF-signal or<br>1 us OFF-signal + 1 us ON-signal<br>0.5 us ON-signal + 0.5 us OFF-signal or<br>0.5 us OFF-signal + 0.5 us ON-signal |

In Table 11, each signal is represented by a length including a CP. That is, CP+3.2 us/m including a CP may indicate one one-bit information.

For example, when m=4 in Option 2, since the length of a symbol carrying one piece of information is CP+0.8 us, a 1 us off signal or 1 us on signal includes a CP (0.2 us)+0.8 us signal. In Option 2, since Manchester coding is applied, a symbol is repeated. Thus, when m=4, data rate for one piece of information may be 500 Kbps.

In another example, when m=8 in Option 2, since the length of a symbol carrying one piece of information is CP+0.4 us, a 0.5 us off signal or a 0.5 us on signal includes a CP (0.1 us)+0.4 us signal. In Option 2, since Manchester coding is applied, a symbol is repeated. Thus, when m=8, data rate for one piece of information may be 1 Mbps.

The following table shows data rates that can be obtainable through the foregoing embodiments.

TABLE 12

| CP | Default symbol (Embodiment 1) (CP + 3.2 us) | Man. Symbol (Embodiment 2) (CP + 1.6 + CP + 1.6) | Man. Symbol (Embodiment 3) (CP + 1.6 + 1.6) |
|---|---|---|---|
| 0.4 us | 277.8 | 250.0 | 277.8 |
| 0.8 us | 250.0 | 208.3 | 250.0 |

TABLE 13

| | Symbol rep. n (CP + 3.2 us) | | | Symbol rep. CP + n (3.2 us) | | | Man. symbol rep. n (CP + 1.6 us + CP + 1.6 us) | | |
|---|---|---|---|---|---|---|---|---|---|
| CP | n = 2 (Embodiment 4) | n = 3 (Embodiment 5) | n = 4 (Embodiment 6) | n = 2 (Embodiment 7) | n = 3 (Embodiment 8) | n = 4 (Embodiment 9) | n = 2 (Embodiment 10) | n = 3 (Embodiment 11) | n = 4 (Embodiment 12) |
| 0.4 us | 138.9 | 92.6 | 69.4 | 147.1 | 100.0 | 75.8 | 125.0 | 83.3 | 62.5 |
| 0.8 us | 125.0 | 83.3 | 62.5 | 138.9 | 96.2 | 73.5 | 104.2 | 69.4 | 52.1 |

TABLE 14

| | Man. symbol rep. CP + n (1.6 us + 1.6 us) | | | Symbol reduction CP + 3.2 us/m | | |
|---|---|---|---|---|---|---|
| CP | n = 2 (Embodiment 13) | n = 3 (Embodiment 14) | n = 4 (Embodiment 15) | m = 2 (Embodiment 16) | m = 4 (Embodiment 17) | m = 8 (Embodiment 18) |
| 0.4 us | 147.1 | 100.0 | 75.8 | 500.0 | 833.3 | 1250.0 |
| 0.8 us | 138.9 | 96.2 | 73.5 | 416.7 | 625.0 | NA |

TABLE 15

| | Symbol reduction CP + 3.2 us/m | | Man. symbol rep. w/Man. CP + 3.2 us/m + CP + 3.2 us/m | |
|---|---|---|---|---|
| CP | m = 4 | m = 8 | m = 4 | m = 8 |
| 0.1 us | 1111.1 | 2000 | 555.6 | 1000 |
| 0.2 us | 1000 | 1666.7 | 500 | 833.3 |

Additionally, hereinafter, a method for configuring an OOK symbol being used in various symbol types in the 802.11ba system will be proposed, and, most particularly, the proposal will be more focused on the method for configuring an ON-signal.

As described above, various symbol types for WUR support may be considered, and the method for configuring the ON-signal may be differently configured according to each symbol type. However, if the ON-signal is differently configured for each symbol type, this may cause complexity in the transmitting device. Therefore, it may be more effective to unify the method for configuring ON-signals for all symbol types. For this, the present disclosure proposes various ON-signal configuration methods that may be used in each symbol type and, most particularly, proposes a unified configuration method according to symbol types being used in WUR.

When assuming that the conventional (or existing) Wi-Fi transmitting device is used, the transmission of a WUR frame by using part of the subcarriers among a total of 64 20 MHz subcarriers is considered. In case of using 1 lax, a wake-up frame transmission may be assumed by using only part of the subcarriers are used, among a total of 256 subcarriers, or a wake-up frame transmission may be assumed by using part of the Rus among an OFDMA tone plan. At this point, appropriate coefficients are inserted in subcarriers that are available for configuring the ON-signal, and 0 is inserted in the remaining subcarriers that are not used. Among the available subcarriers, 0 may be inserted in the DC. The inserted coefficients may be set to values optimizing the PAPR. The inserted coefficients may be selected from 1 or −1 or may be selected from 1, 1, j, and −j. Additionally, according to a particular method, the coefficient of 0 may be inserted in part of the subcarriers, among the available subcarriers. After inserting the coefficients in the subcarrier, 64 IFFT (256 IFFT in 11ax) is applied so as to generate a 3.2 us signal in the time domain, and all of the time domain signals configured for the ON-signal may be used or only some of the time domain signals may be used by applying an appropriate method, and then a CP may be applied. The CP may be equal to 0.4 us or 0.8 us or may be equal to another value. Hereinafter various method for configuring the ON-signal will be described.

1. Insert Coefficients to all Available Subcarriers

Coefficients are inserted to all available subcarriers. 0 is inserted to the DC, 0 is also inserted to other non-available subcarriers. In this case, when IFFT is applied, 3.2 us time domain signals having no specific repetition (having no specific cycle period) may be generated, and these signals may be used in a generic OOK symbol type or a symbol repetition type, among the various symbol types.

A. Generic OOK Symbol Type

All of the generated 3.2 us signals may be used to configure CP+3.2 us, and this may be used as an ON-symbol for notifying Information 1. An OFF-symbol may be configured by not transmitted any information during a time period of CP+3.2 us and may then be used for notifying Information 0.

B. Symbol Repetition Type

The 3.2 us signal being generated, as described above, is used to configure CP+3.2 us so as to generate an ON-signal. And, by not transmitting any information during the same period of time, an OFF-signal is configured. This process may be repeated so as to configure a symbol for notifying Information 0 or Information 1 in the symbol repetition type. For example, a symbol notifying Information 1 may be configured by repeating the ON-signal. And, conversely, a symbol notifying Information 0 may be configured by repeating the OFF-signal. Alternatively, each symbol may be configured by using both the ON-signal and the OFF-signal.

For example, by applying Manchester coding, a symbol may be configured so that transition can occur at the center of the symbol. When considering a 2-time repetition of the symbol, the symbol for notifying Information 0 may be configured of ON-signal+OFF-signal, and the symbol for notifying Information 1 may be configured of OFF-signal+ON-signal, or vice versa.

2. Insert Coefficients to all Available Subcarriers in Units of 2 Spaces

Coefficients are inserted to all available subcarriers in units of 2 spaces. 0 is inserted to the other available subcarriers, and 0 is also inserted to the DC, and 0 is also inserted to other non-available subcarriers. In this case, when IFFT is applied, 3.2 us time domain signals having a cycle period of 1.6 us may be generated, and these signals may be used in a generic OOK symbol type, a symbol repetition type, a Manchester coding based symbol type or a ½ symbol reduction type, among the various symbol types.

A. Generic OOK Symbol Type

All of the generated 3.2 us signals having a cycle period of 1.6 us may be used to configure CP+3.2 us, and this may be used as an ON-symbol for notifying Information 1. An OFF-symbol may be configured by not transmitted any information during a time period of CP+3.2 us and may then be used for notifying Information 0.

B. Manchester Coding Based Symbol Type

In the 3.2 us signal having a cycle period of 1.6 us, which is generated as described above, a first 1.6 us part or a last 1.6 us part is used, and, by inserting a CP herein, an ON-signal of CP+1.6 us may be configured. Additionally, by not transmitting any information for a time period of CP+1.6 us, an OFF-signal may be configured. Then, by using the ON-signal and the OFF-signal, which are generated as described above, a symbol for notifying Information 0 or Information 1 may be configured. For example, the symbol for notifying Information 0 may be configured of ON-signal+OFF-signal, and the symbol for notifying Information 1 may be configured of OFF-signal+ON-signal, or vice versa.

C. Symbol Repetition Type

All of the 3.2 us signal having a cycle period of 1.6 us, which is generated as described above, is used to configure CP+3.2 us so as to generate an ON-signal. And, by not transmitting any information during the same period of time, an OFF-signal is configured. This process may be repeated so as to configure a symbol for notifying Information 0 or Information 1. For example, a symbol notifying Information 1 may be configured by repeating the ON-signal. And, conversely, a symbol notifying Information 0 may be configured by repeating the OFF-signal. Alternatively, each symbol may be configured by using both the ON-signal and the OFF-signal.

For example, by applying Manchester coding, a symbol may be configured so that transition can occur at the center of the symbol. When considering a 2-time repetition of the symbol, the symbol for notifying Information 0 may be configured of ON-signal+OFF-signal, and the symbol for notifying Information 1 may be configured of OFF-signal+ON-signal, or vice versa.

Meanwhile, a symbol for notifying Information 0 or Information 1 may be configured by repeating the Manchester coding based symbol type. More specifically, in the 3.2 us signal having a cycle period of 1.6 us, a first 1.6 us part or a last 1.6 us part is used, and, by inserting a CP herein, an ON-signal of CP+1.6 us may be configured. Thereafter, by not transmitting any information for a time period of CP+1.6 us, an OFF-signal may be configured. Then, by using the ON-signal and the OFF-signal, a symbol may be configured.

For example, when considering a symbol having the Manchester coding based symbol type repeated 2 times, the symbol for notifying Information '0' may be configured of ON-signal+OFF-signal+ON-signal+OFF-signal, and the symbol for notifying Information 1 may be configured of OFF-signal+ON-signal+OFF-signal+ON-signal, or vice versa.

D. ½ Symbol Reduction Type

In the aforementioned 3.2 us signal having a cycle period of 1.6 us, a first 1.6 us part or a last 1.6 us part is used, and, by inserting a CP herein, an ON-signal of CP+1.6 us may be configured. And, this may be an ON-symbol for notifying Information 1. Additionally, by not transmitting any information for a time period of CP+1.6 us, an OFF-signal may be configured. And, this may be an OFF-symbol for notifying Information 0.

3. Insert Coefficients to all Available Subcarriers in Units of 4 Spaces

Coefficients are inserted to all available subcarriers in units of 4 spaces. 0 is inserted to the other available subcarriers, and 0 is also inserted to the DC, and 0 is also inserted to other non-available subcarriers. In this case, when IFFT is applied, 3.2 us time domain signals having a cycle period of 0.8 us may be generated, and these signals may be used in a generic OOK symbol type, a symbol repetition type, a Manchester coding based symbol type or a ½ or ¼ symbol reduction type, among the various symbol types.

A. Generic OOK Symbol Type

All of the generated 3.2 us signals having a cycle period of 0.8 us may be used to configure CP+3.2 us, and this may be used as an ON-symbol for notifying Information 1. An OFF-symbol may be configured by not transmitted any information during a time period of CP+3.2 us and may then be used for notifying Information 0.

B. Manchester Coding Based Symbol Type

In the 3.2 us signal having a cycle period of 0.8 us, which is generated as described above, a first 0.8 us part or a second 0.8 us part or a third 0.8 us part or a last 0.8 us part may be selected and repeated 2 times (a first 1.6 us part or a last 1.6 us part may be selected), and, by inserting a CP herein, an ON-signal of CP+1.6 us may be configured. Additionally, by not transmitting any information for a time period of CP+1.6 us, an OFF-signal may be configured. Then, by using the ON-signal and the OFF-signal, which are generated as described above, a symbol for notifying Information 0 or Information 1 may be configured. For example, the symbol for notifying Information 0 may be configured of ON-signal+OFF-signal, and the symbol for notifying Information 1 may be configured of OFF-signal+ON-signal, or vice versa.

C. Symbol repetition type

All of the 3.2 us signal having a cycle period of 0.8 us, which is generated as described above, is used to configure CP+3.2 us so as to generate an ON-signal. And, by not transmitting any information during the same period of time, an OFF-signal is configured. This process may be repeated so as to configure a symbol for notifying Information 0 or Information 1. For example, a symbol notifying Information 1 may be configured by repeating the ON-signal. And, conversely, a symbol notifying Information 0 may be configured by repeating the OFF-signal. Alternatively, each symbol may be configured by using both the ON-signal and the OFF-signal. For example, by applying Manchester coding, a symbol may be configured so that transition can occur at the center of the symbol. When considering a 2-time repetition of the symbol, the symbol for notifying Information 0 may be configured of ON-signal+OFF-signal, and the symbol for notifying Information 1 may be configured of OFF-signal+ON-signal, or vice versa.

Meanwhile, a symbol for notifying Information 0 or Information 1 may be configured by repeating the Manchester coding based symbol type. More specifically, in the 3.2 us signal having a cycle period of 0.8 us, which is generated as described above, a first 0.8 us part or a second 0.8 us part or a third 0.8 us part or a last 0.8 us part may be selected and repeated 2 times (a first 1.6 us part or a last 1.6 us part may be selected), and, by inserting a CP herein, an ON-signal of CP+1.6 us may be configured. Additionally, by not transmitting any information for a time period of CP+1.6 us, an OFF-signal may be configured. Then, by using the ON-signal and the OFF-signal, a symbol may be configured. For example, when considering a symbol having the Manchester coding based symbol type repeated 2 times, the symbol for notifying Information 0 may be configured of ON-signal+OFF-signal+ON-signal+OFF-signal, and the symbol for notifying Information 1 may be configured of OFF-signal+ON-signal+OFF-signal+ON-signal, or vice versa.

D. ½ Symbol Reduction Type

In the 3.2 us signal having a cycle period of 0.8 us, which is generated as described above, a first 0.8 us part or a second 0.8 us part or a third 0.8 us part or a last 0.8 us part may be selected and repeated 2 times (a first 1.6 us part or a last 1.6 us part may be selected), and, by inserting a CP herein, an ON-signal of CP+1.6 us may be configured. And, this may be an ON-symbol for notifying Information 1. Additionally, by not transmitting any information for a time period of CP+1.6 us, an OFF-signal may be configured. And, this may be an OFF-symbol for notifying Information 0.

E. ¼ Symbol Reduction Type

In the 3.2 us signal having a cycle period of 0.8 us, which is generated as described above, a first 0.8 us part or a second 0.8 us part or a third 0.8 us part or a last 0.8 us part may be used, and, by inserting a CP herein, an ON-signal of CP+0.8 us may be configured. And, this may be an ON-symbol for notifying Information 1. Additionally, by not transmitting any information for a time period of CP+0.8 us, an OFF-signal may be configured. And, this may be an OFF-symbol for notifying Information 0. The length of the CP may not only be equal to the aforementioned 0.4 us and 0.8 us but may also be equal to 0.2 us.

4. Insert Coefficients to all Available Subcarriers in Units of 8 Spaces

Coefficients are inserted to all available subcarriers in units of 8 spaces. 0 is inserted to the other available subcarriers, and 0 is also inserted to the DC, and 0 is also inserted to other non-available subcarriers. In this case, when IFFT is applied, 3.2 us time domain signals having a cycle period of 0.4 us may be generated, and these signals may be used in a generic OOK symbol type, a symbol repetition type, a Manchester coding based symbol type or a ½, ¼, or ⅛ symbol reduction type, among the various symbol types.

A. Generic OOK Symbol Type

All of the generated 3.2 us signals having a cycle period of 0.4 us may be used to configure CP+3.2 us, and this may be used as an ON-symbol for notifying Information 1. An OFF-symbol may be configured by not transmitted any information during a time period of CP+3.2 us and may then be used for notifying Information.

B. Manchester Coding Based Symbol Type

In the 3.2 us signal having a cycle period of 0.4 us, which is generated as described above, a first 0.4 us part or a second 0.4 us part or a third 0.4 us part or a fourth 0.4 us part or a fifth 0.4 us part or a sixth 0.4 us part or a seventh 0.4 us part or a last 0.4 us part may be selected and repeated 4 times (a first 1.6 us part or a last 1.6 us part may be selected), and, by inserting a CP herein, an ON-signal of CP+1.6 us may be configured. Additionally, by not transmitting any information for a time period of CP+1.6 us, an OFF-signal may be configured. Then, by using the ON-signal and the OFF-signal, which are generated as described above, a symbol for notifying Information 0 or Information 1 may be configured. For example, the symbol for notifying Information 0 may be configured of ON-signal+OFF-signal, and the symbol for notifying Information 1 may be configured of OFF-signal+ON-signal, or vice versa.

C. Symbol Repetition Type

All of the 3.2 us signal having a cycle period of 0.4 us, which is generated as described above, is used to configure CP+3.2 us so as to generate an ON-signal. And, by not transmitting any information during the same period of time, an OFF-signal is configured. This process may be repeated so as to configure a symbol for notifying Information 0 or Information 1. For example, a symbol notifying Information 1 may be configured by repeating the ON-signal. And, conversely, a symbol notifying Information 0 may be configured by repeating the OFF-signal. Alternatively, each symbol may be configured by using both the ON-signal and the OFF-signal.

For example, by applying Manchester coding, a symbol may be configured so that transition can occur at the center of the symbol. When considering a 2-time repetition of the symbol, the symbol for notifying Information 0 may be configured of ON-signal+OFF-signal, and the symbol for notifying Information 1 may be configured of OFF-signal+ON-signal, or vice versa.

Meanwhile, a symbol for notifying Information 0 or Information 1 may be configured by repeating the Manchester coding based symbol type. More specifically, in the 3.2 us signal having a cycle period of 0.4 us, which is generated as described above, a first 0.4 us part or a second 0.4 us part or a third 0.4 us part or a fourth 0.4 us part or a fifth 0.4 us part or a sixth 0.4 us part or a seventh 0.4 us part or a last 0.4 us part may be selected and repeated 2 times (a first 1.6 us part or a last 1.6 us part may be selected), and, by inserting a CP herein, an ON-signal of CP+1.6 us may be configured. Additionally, by not transmitting any information for a time period of CP+1.6 us, an OFF-signal may be configured. Then, by using the ON-signal and the OFF-signal, a symbol may be configured. For example, when considering a symbol having the Manchester coding based symbol type repeated 2 times, the symbol for notifying Information 0 may be configured of ON-signal+OFF-signal+ON-signal+OFF-signal, and the symbol for notifying Information 1 may be configured of OFF-signal+ON-signal+OFF-signal+ON-signal, or vice versa.

D. ½ Symbol Reduction Type

In the 3.2 us signal having a cycle period of 0.4 us, which is generated as described above, a first 0.4 us part or a second 0.4 us part or a third 0.4 us part or a fourth 0.4 us part or a fifth 0.4 us part or a sixth 0.4 us part or a seventh 0.4 us part or a last 0.4 us part may be selected and repeated 4 times (a first 1.6 us part or a last 1.6 us part may be selected), and, by inserting a CP herein, an ON-signal of CP+1.6 us may be configured. And, this may be an ON-symbol for notifying Information 1. Additionally, by not transmitting any information for a time period of CP+1.6 us, an OFF-signal may be configured. And, this may be an OFF-symbol for notifying Information 0.

E. ¼ Symbol Reduction Type

In the 3.2 us signal having a cycle period of 0.4 us, which is generated as described above, a first 0.4 us part or a second 0.4 us part or a third 0.4 us part or a fourth 0.4 us part or a fifth 0.4 us part or a sixth 0.4 us part or a seventh 0.4 us part or a last 0.4 us part may be selected and repeated 2 times (a first 0.8 us part or a second 0.8 us part or a third 0.8 us part or a last 0.8 us part may be selected), and, by inserting a CP herein, an ON-signal of CP+0.8 us may be configured. And, this may be an ON-symbol for notifying Information 1. Additionally, by not transmitting any information for a time period of CP+0.8 us, an OFF-signal may be configured. And, this may be an OFF-symbol for notifying Information 0. The length of the CP may not only be equal to the aforementioned 0.4 us and 0.8 us but may also be equal to 0.2 us. Or, the length of the CP may be equal to another value.

F. ⅛ Symbol Reduction Type

In the 3.2 us signal having a cycle period of 0.4 us, which is generated as described above, a first 0.4 us part or a second 0.4 us part or a third 0.4 us part or a fourth 0.4 us part or a fifth 0.4 us part or a sixth 0.4 us part or a seventh 0.4 us part or a last 0.4 us part may be used, and, by inserting a CP herein, an ON-signal of CP+0.4 us may be configured. And, this may be an ON-symbol for notifying Information 1. Additionally, by not transmitting any information for a time period of CP+0.4 us, an OFF-signal may be configured. And, this may be an OFF-symbol for notifying Information 0. The length of the CP may not only be equal to the aforementioned 0.4 us and 0.8 us but may also be equal to 0.1 us. Or, the length of the CP may be equal to another value.

5. Unification of the Signal Configuration Methods and CP Length

When using various symbol types, the complexity of the transmitting device may be reduced by unifying the configuration of the ON-signal. For example, only the generic OOK symbol type, the symbol repetition type, the Manchester coding based symbol type or the ½ symbol reduction type may be used in WUR. And, in this case, among the aforementioned 4 configuration methods, the ON-signal configuration method may be unified to a method of inserting coefficients to all available subcarriers in units of 2 spaces (units of 4 spaces and 8 spaces are also possible). Additionally, in this case, for each ON-signal or OFF-signal, the CP length of the generic OOK type may be equal to 0.8 us, and the CP lengths of the Manchester coding based OOK type and the ½ symbol reduction type may both be equal to 0.4 us. The CP length of the symbol repetition type may be equal to 0.8 us in case of repeating the generic OOK type and may be equal to 0.4 us in case of repeating the Manchester coding based OOK type. In this case, the total CP length per symbol is equal to 0.8 us for the generic OOK symbol type and the Manchester coding based OOK symbol type. The total CP length per symbol is equal to 0.4 us for the ½ symbol reduction type. And, the total CP length per symbol is equal to 0.8 us*number of repetitions for the symbol repetition type. Additionally, the length of one symbol in each type is as shown below.

TABLE 16

| Normal OOK symbol | Manchester coding based OOK symbol | symbol repetition | ½ symbol reduction |
|---|---|---|---|
| 4 us | 4 us | 4 us*number of repetitions | 2 us |

Only a 2-tume repetition may be used in the symbol repetition type.

Meanwhile, only the generic OOK symbol type, the Manchester coding based OOK symbol type, the 2-time repetition symbol repetition type may be used in WUR. And, in this case, among the aforementioned 4 configuration methods, the ON-signal configuration method may be unified to a method of inserting coefficients to all available subcarriers in units of 2 spaces (units of 4 spaces and 8 spaces are also possible). Additionally, in this case, for each ON-signal or OFF-signal, the CP length of the generic OOK symbol type may be equal to 0.8 us, and the CP length of the Manchester coding based symbol type may be equal to 0.4 us. The CP length of the symbol repetition type may be equal to 0.8 us in case of repeating the generic OOK symbol type and may be equal to 0.4 us in case of repeating the Manchester coding based OOK type. In this case, the total CP length per symbol is equal to 0.8 us for the generic OOK symbol type and the Manchester coding based OOK symbol type. And, the total CP length per symbol is equal to 1.6 us for the symbol repetition type. Additionally, the length of one symbol in each type is as shown below.

TABLE 17

| Normal OOK symbol | Manchester coding based OOK symbol | symbol repetition |
|---|---|---|
| 4 us | 4 us | 8 us |

Meanwhile, only the generic OOK symbol type and the 2-time repetition symbol repetition type may be used in WUR. And, in this case, among the aforementioned 4 configuration methods, the ON-signal configuration method may be unified to a method of inserting coefficients to all available subcarriers in units of 2 spaces (units of 4 spaces and 8 spaces are also possible). Additionally, in this case, for each ON-signal or OFF-signal, the CP lengths of the two types may be equal to 0.8 us. In this case, the total CP length per symbol is equal to 0.8 us for the generic OOK symbol type. And, the total CP length per symbol is equal to 1.6 us for the symbol repetition type. Additionally, the length of one symbol in each type is as shown below.

TABLE 18

| Normal OOK symbol | symbol repetition |
|---|---|
| 4 us | 8 us |

Meanwhile, only the Manchester coding based OOK symbol type and the 2-time repetition symbol repetition type may be used in WUR. And, in this case, among the aforementioned 4 configuration methods, the ON-signal configuration method may be unified to a method of inserting coefficients to all available subcarriers in units of 2 spaces (units of 4 spaces and 8 spaces are also possible). Additionally, in this case, for each ON-signal or OFF-signal, the CP lengths of the two types may be equal to 0.4 us. In this case, the total CP length per symbol is equal to 0.8 us for the Manchester coding based OOK symbol type. And, the total CP length per symbol is equal to 1.6 us for the symbol repetition type. Additionally, the length of one symbol in each type is as shown below.

TABLE 19

| Manchester coding based OOK symbol | symbol repetition |
|---|---|
| 4 us | 8 us |

Meanwhile, only the generic OOK symbol type and the Manchester coding based OOK symbol type may be used in WUR. And, in this case, among the aforementioned 4 configuration methods, the ON-signal configuration method may be unified to a method of inserting coefficients to all available subcarriers in units of 2 spaces (units of 4 spaces and 8 spaces are also possible). Additionally, in this case, for each ON-signal or OFF-signal, the CP length of the generic OOK symbol type may be equal to 0.8 us, and the CP length of the Manchester coding based symbol type may be equal to 0.4 us. In this case, the total CP length per symbol is equal to 0.8 us for the two symbol types. Additionally, the length of one symbol in each type is as shown below.

TABLE 20

| Normal OOK symbol | Manchester coding based OOK symbol |
|---|---|
| 4 us | 4 us |

6. Alternative Method

Coefficients are inserted to all available subcarriers, or coefficients are inserted in units of 2 paces, 4 spaces, or 8 spaces. 0 may be inserted to the DC, and 0 may also be inserted to other non-available subcarriers. In this case, when IFFT is applied, 3.2 us time domain signals having no specific repetition or having a cycle period of 1.6 us or 0.8 us or 0.4 us may be generated, and these signals may be used in all symbol types. However, proposed herein is a method for configuring an On-signal according to all symbol types by using the 3.2 us signal, which is obtained by applying IFFT by interesting coefficients to all available subcarriers.

A. Generic OOK Symbol Type

All of the generated 3.2 us signals may be used to configure CP+3.2 us, and this may be used as an ON-symbol for notifying Information 1. An OFF-symbol may be configured by not transmitted any information during a time period of CP+3.2 us and then used for notifying Information 0.

B. Manchester Coding Based Symbol Type

In the 3.2 us signal, which is generated as described above, a first 1.6 us part or a last 1.6 us part is selected, and, by inserting a CP herein, an ON-signal of CP+1.6 us may be configured. Alternatively, in the 3.2 us signal (4 us), which is generated as described above, a first CP+1.6 us part or a last CP+1.6 us part may be selected so as to configure an ON-signal. Additionally, by not transmitting any information for a time period of CP+1.6 us, an OFF-signal may be configured. Then, by using the ON-signal and the OFF-signal, which are generated as described above, a symbol for notifying Information 0 or Information 1 may be configured. For example, the symbol for notifying Information 0 may be configured of ON-signal+OFF-signal, and the symbol for notifying Information 1 may be configured of OFF-signal+ON-signal, or vice versa.

C. Symbol Repetition Type

All of the 3.2 us signal, which is generated as described above, is used to configure CP+3.2 us so as to generate an ON-signal. And, by not transmitting any information during the same period of time, an OFF-signal is configured. This process may be repeated so as to configure a symbol for notifying Information 0 or Information 1. For example, a symbol notifying Information 1 may be configured by repeating the ON-signal. And, conversely, a symbol notifying Information 0 may be configured by repeating the OFF-signal. Alternatively, each symbol may be configured by using both the ON-signal and the OFF-signal. For example, by applying Manchester coding, a symbol may be configured so that transition can occur at the center of the symbol. When considering a 2-time repetition of the symbol, the symbol for notifying Information 0 may be configured of ON-signal+OFF-signal, and the symbol for notifying Information 1 may be configured of OFF-signal+ON-signal, or vice versa.

Meanwhile, a symbol for notifying Information 0 or Information 1 may be configured by repeating the Manchester coding based symbol type. More specifically, in the 3.2 us signal, which is generated as described above, a first 1.6 us part or a last 1.6 us part is used, and, by inserting a CP herein, an ON-signal of CP+1.6 us may be configured. Alternatively, in the 3.2 us signal (4 us), which is generated as described above, a first CP+1.6 us part or a last CP+1.6 us part may be selected so as to configure an ON-signal. Additionally, by not transmitting any information for a time period of CP+1.6 us, an OFF-signal may be configured. Then, by using the ON-signal and the OFF-signal, a symbol may be configured. For example, when considering a symbol having the Manchester coding based symbol type repeated 2 times, the symbol for notifying Information 0 may be configured of ON-signal+OFF-signal+ON-signal+OFF-signal, and the symbol for notifying Information 1 may be configured of OFF-signal+ON-signal+OFF-signal+ON-signal, or vice versa.

D. ½ Symbol Reduction Type

In the 3.2 us signal, which is generated as described above, a first 1.6 us part or a last 1.6 us part is used, and, by inserting a CP herein, an ON-signal of CP+1.6 us may be configured. Alternatively, in the 3.2 us signal (4 us), which is generated as described above, a first CP+1.6 us part or a last CP+1.6 us part may be selected so as to configure an ON-signal. And, this may be an ON-symbol for notifying Information 1. Additionally, by not transmitting any information for a time period of CP+1.6 us, an OFF-signal may be configured. And, this may be an OFF-symbol for notifying Information 0.

E. ¼ Symbol Reduction Type

In the 3.2 us signal, which is generated as described above, a first 0.8 us part or a last 0.8 us part is used, and, by inserting a CP herein, an ON-signal of CP+0.8 us may be configured. Alternatively, in the 3.2 us signal (4 us), which is generated as described above, a first CP+0.8 us part or a last CP+0.8 us part may be selected so as to configure an ON-signal. And, this may be an ON-symbol for notifying Information 1. Additionally, by not transmitting any information for a time period of CP+0.8 us, an OFF-signal may be configured. And, this may be an OFF-symbol for notifying Information 0. The length of the CP may not only be equal to the aforementioned 0.4 us and 0.8 us but may also be equal to 0.2 us. Or, the length of the CP may be equal to another value.

F. ⅛ Symbol Reduction Type

In the 3.2 us signal, which is generated as described above, a first 0.4 us part or a last 0.4 us part is used, and, by inserting a CP herein, an ON-signal of CP+0.4 us may be configured. Alternatively, in the 3.2 us signal (4 us), which is generated as described above, a first CP+0.4 us part or a last CP+0.4 us part may be selected so as to configure an ON-signal. And, this may be an ON-symbol for notifying Information 1. Additionally, by not transmitting any information for a time period of CP+0.4 us, an OFF-signal may be configured. And, this may be an OFF-symbol for notifying Information 0. The length of the CP may not only be equal to the aforementioned 0.4 us and 0.8 us but may also be equal to 0.1 us. Or, the length of the CP may be equal to another value.

Additionally, by using both the ON-signal and the OFF-signal, which are configured in each of the above-described ½, ¼, and ⅛ symbol reduction types, one symbol applying the Manchester coding method may be configured. For example, the symbol for notifying Information 0 may be configured of ON-signal+OFF-signal, and the symbol for notifying Information 1 may be configured of OFF-signal+ON-signal, or vice versa.

At this point, if the ½ symbol reduction type is applied, the ON-signal or OFF-signal may be configured of CP+1.6 us. If the ¼ symbol reduction type is applied, the ON-signal or OFF-signal may be configured of CP+0.8 us. And, if the ⅛ symbol reduction type is applied, the ON-signal or OFF-signal may be configured of CP+0.4 us.

Figure 13:
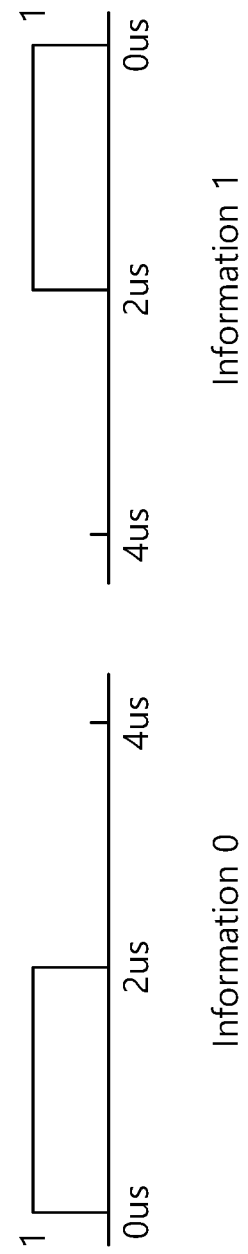
FIG. 13 shows an example in which a 2 us on signal is configured based on signal masking according to the present embodiment.

FIG. 13 shows an example in which a 2 us on signal is configured based on signal masking according to the present embodiment.

A data rate can be secured depending on various symbol types which may be used in the WUR. In this case, in order to secure a data rate of 250 Kbps, a method for generating a 2 us on signal may be proposed. FIG. 13 proposes a masking-based scheme using a sequence of a length 13 (a coefficient has been inserted into all consecutive 13 subcarriers of a 20 MHz band).

Referring to FIG. 13, in the case of a masking-based approach method, first, a 4 us OOK symbol may be generated. 64-point IFFT is performed by applying a sequence of a length 13 to consecutive 13 subcarriers of a 20 MHz band.

A 4 us OOK symbol is generated by adding a 0.8 us CP or GI. Furthermore, a 2 us on signal may be configured by masking half of the 4 us OOK symbol.

For example, referring to FIG. 13, in information 0, a 2 us on signal may be configured by taking a front part, that is, half of a 4 us symbol. A 2 us off signal may be configured by not transmitting any information in a rear part, that is, half of the 4 us symbol. Furthermore, in information 1, a 2 us on signal may be configured by taking a rear part, that is, half of a 4 us symbol. A 2 us off signal may be configured by not transmitting any information in a front part, that is, half of the 4 us symbol.

Additionally, hereinafter, a method for differently configuring the lengths of preambles being included in a WUR packet according to an environment, in order reduce overhead when performing WUR packet transmission in an 802.11ba system will be proposed. Herein, the environment may refer to a channel status or may refer to a situation where a data rate of 250 kbps or more is used in the wake-up payload.

Figure 14:
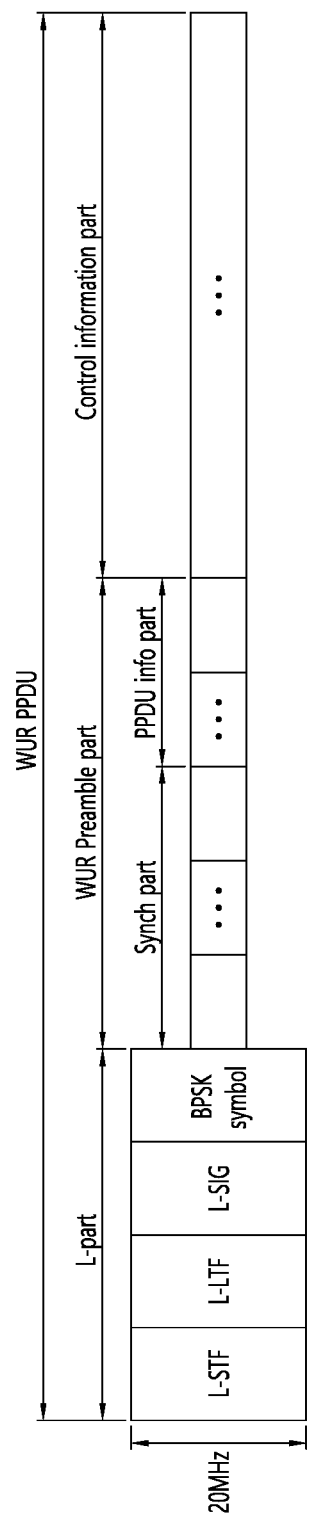
FIG. 14 illustrates another example of a wake-up packet according an embodiment of this specification.

FIG. 14 illustrates another example of a wake-up packet according an embodiment of this specification.

FIG. 14 shows an example of a wake-up packet structure, which shows a broader aspect of the wake-up packet structure of FIG. 6.

Referring to FIG. 14, data rates of 62.5 kbps and 250 kbps may be used in the payload (control information part), and an equal or higher data rate may be used in STAs having excellent link quality. For example, 500 kbps and 1 Mbps may be used. More specifically, the length of the control information part is variable depending upon the channel situation. And, although the throughput and overhead may be reduced by using the control information part, in a situation where a WUR preamble part (most particularly, a synch part or sync part) is designed while considering a poor channel situation (i.e., worst case), since the control information part may have a considerably long length, in this case, it may be difficult to obtain overhead gain. Therefore, it may be advantageous in the aspect of the overhead or power consumption to configure the length of the preamble based on the situation. And, this may be directly instructed by the main radio, or this may be indirectly indicated by a data rate indication from the main radio.

In this specification, in the aspect of the physical layer, among the WUR preamble part, the proposal shall be focused on the length of the sync part. Herein, although the WUR preamble assumes OOK modulation, this specification will not be limited only to this. When assuming OOK modulation, coefficient 1 of a sequence indicates an on-signal, and coefficient 0 or −1 indicates an off-signal, or vice versa. And, Manchester coding may also be applied. Additionally, a PN sequence, a Golay sequence, a maximum length sequence (MLS), and so on, each having an excellent correlation characteristic, may be used as the sequence of the WUR preamble, and, for this, some coefficients may be added. Hereinafter, examples of WUR preamble sequences having various lengths will be described.

1) Maximum Length Sequence (MLS)

By adding 0s to the existing MLS sequence, an even-number-length sequence may be configured.

Length 8: [0,1,0,0,1,1,1,0]

Length 16: [0,1,0,0,0,1,1,1,1,0,1,0,1,1,0,0]

Length 32: [0,1,0,0,0,0,1,0,1,0,1,1,1,0,1,1,0,0,0,1,1,1,1,1,0,0,1,1,0,1,0,0]

2) PN Sequence

Length 15: [1000 1111 0101 100]

The following length-32 sequence may be configured by using the PN sequence 2 times and inserting 0s at both ends.

3) Golay Sequence

Length 16: [0,1,0,0,0,1,1,1,1,0,1,0,1,1,0,0]

Length 32: [1,1,1,1,1,0,1,0,0,0,1,1,1,0,0,1,1,1,0,0,0,1,0,0,1,0,0,0,0,1,0,1,0]

Length 64: [0,0,0,0,0,1,0,0,0,0,1,1,0,0,0,1,0,1,0,0,1,1,1,1,0,1,0,0,0,1,1,1,0,0,1,0,0,1,0,1,1,0,1,1,1,0,1,1,0,0,1, 1,0,1,0,1,0,1,1,1,1,1,1,0]

4) Other

Sequences having various lengths may be configured by repeating 1 and 0.

Hereinafter, a method for variously using WUR preamble lengths will be proposed while focusing on the sequence length and symbol length (length per bit of a sequence).

1) Length Adjustment of WUR Preamble According to the Sequence

In case of considering 62.5 kbps as the data rate of the WUR payload, a WUR preamble length of 128 us or more is needed, and a WUR preamble of length 128 us may be configured as shown below in the following examples.

Example 1) Symbol length 1 us, Sequence length 128 used

Example 2) Symbol length 1 us, Sequence length 64 repeated 2 times

Example 3) Symbol length 1 us, Sequence length 32 repeated 4 times

Example 4) Symbol length 1 us, Sequence length 16 repeated 8 times

Example 5) Symbol length 1 us, Sequence length 8 repeated 16 times

Example 6) Symbol length 2 us, Sequence length 64 used

Example 7) Symbol length 2 us, Sequence length 32 repeated 2 times

Example 8) Symbol length 2 us, Sequence length 16 repeated 4 times

Example 9) Symbol length 2 us, Sequence length 8 repeated 8 times

Example 10) Symbol length 4 us, Sequence length 32 used

Example 11) Symbol length 4 us, Sequence length 16 repeated 2 times

Example 12) Symbol length 4 us, Sequence length 8 repeated 4 times

The following embodiment is an example of configuring a length 64 us WUR preamble by changing the sequence length of each of the aforementioned examples.

Example 1) Symbol length 1 us, Sequence length 64 used

Example 2) Symbol length 1 us, Sequence length 32 repeated 2 times or Sequence length 64 used Example 3) Symbol length 1 us, Sequence length 16 repeated 4 times or Sequence length 32 repeated 2 times Example 4) Symbol length 1 us, Sequence length 8 repeated 8 times or Sequence length 16 repeated 4 times Example 5) Symbol length 1 us, Sequence length 4 repeated 16 times or Sequence length 8 repeated 8 times Example 6) Symbol length 2 us, Sequence length 32 used Example 7) Symbol length 2 us, Sequence length 16 repeated 2 times or Sequence length 32 used Example 8) Symbol length 2 us, Sequence length 8 repeated 4 times or Sequence length 16 repeated 2 times Example 9) Symbol length 2 us, Sequence length 4 repeated 8 times or Sequence length 8 repeated 4 times Example 10) Symbol length 4 us, Sequence length 16 used Example 11) Symbol length 4 us, Sequence length 8 repeated 2 times or Sequence length 16 used Example 12) Symbol length 4 us, Sequence length 4 repeated 4 times or Sequence length 8 repeated 2 times The following embodiment is an example of configuring a length 32 us WUR preamble by changing the sequence length of each of the aforementioned examples.

Example 1) Symbol length 1 us, Sequence length 32 used

Example 2) Symbol length 1 us, Sequence length 16 repeated 2 times or Sequence length 32 used Example 3) Symbol length 1 us, Sequence length 8 repeated 4 times or Sequence length 16 repeated 2 times or Sequence length 32 used Example 4) Symbol length 1 us, Sequence length 4 repeated 8 times or Sequence length 8 repeated 4 times or Sequence length 16 repeated 2 times Example 5) Symbol length 1 us, Sequence length 2 repeated 16 times or Sequence length 4 repeated 8 times or Sequence length 8 repeated 4 times Example 6) Symbol length 2 us, Sequence length 16 used Example 7) Symbol length 2 us, Sequence length 8 repeated 2 times or Sequence length 16 used Example 8) Symbol length 2 us, Sequence length 4 repeated 4 times or Sequence length 8 repeated 2 times or Sequence length 16 used Example 9) Symbol length 2 us, Sequence length 2 repeated 8 times or Sequence length 4 repeated 4 times or Sequence length 8 repeated 2 times Example 10) Symbol length 4 us, Sequence length 8 used Example 11) Symbol length 4 us, Sequence length 4 repeated 2 times or Sequence length 8 used Example 12) Symbol length 4 us, Sequence length 2 repeated 4 times or Sequence length 4 repeated 2 times or Sequence length 8 used The following embodiment is an example of configuring a length 16 us WUR preamble by changing the sequence length of each of the aforementioned examples.

Example 1) Symbol length 1 us, Sequence length 16 used

Example 2) Symbol length 1 us, Sequence length 8 repeated 2 times or Sequence length 16 used Example 3) Symbol length 1 us, Sequence length 4 repeated 4 times or Sequence length 8 repeated 2 times or Sequence length 16 used Example 4) Symbol length 1 us, Sequence length 2 repeated 8 times or Sequence length 4 repeated 4 times or Sequence length 8 repeated 2 times or Sequence length 16 used Example 5) Symbol length 1 us, Sequence length 2 repeated 8 times or Sequence length 4 repeated 4 times or Sequence length 8 repeated 2 times Example 6) Symbol length 2 us, Sequence length 8 used Example 7) Symbol length 2 us, Sequence length 4 repeated 2 times or Sequence length 8 used Example 8) Symbol length 2 us, Sequence length 2 repeated 4 times or Sequence length 4 repeated 2 times or Sequence length 8 used Example 9) Symbol length 2 us, or Sequence length 2 repeated 4 times or Sequence length 4 repeated 2 times or Sequence length 8 used Example 10) Symbol length 4 us, Sequence length 4 used Example 11) Symbol length 4 us, Sequence length 2 repeated 2 times or Sequence length 4 used Example 12) Symbol length 4 us, Sequence length 2 repeated 2 times or Sequence length 4 used 2) Length Adjustment of WUR Preamble According to the Symbol Length In case of considering 62.5 kbps as the data rate of the WUR payload, a WUR preamble length of 128 us or more is needed, and a WUR preamble of length 128 us may be configured as shown below in the following examples.

Example 1) Symbol length 1 us, Sequence length 128 used

Example 2) Symbol length 1 us, Sequence length 64 repeated 2 times

Example 3) Symbol length 1 us, Sequence length 32 repeated 4 times

Example 4) Symbol length 1 us, Sequence length 16 repeated 8 times

Example 5) Symbol length 1 us, Sequence length 8 repeated 16 times

Example 6) Symbol length 2 us, Sequence length 64 used

Example 7) Symbol length 2 us, Sequence length 32 repeated 2 times

Example 8) Symbol length 2 us, Sequence length 16 repeated 4 times

Example 9) Symbol length 2 us, Sequence length 8 repeated 8 times

Example 10) Symbol length 4 us, Sequence length 32 used

Example 11) Symbol length 4 us, Sequence length 16 repeated 2 times

Example 12) Symbol length 4 us, Sequence length 8 repeated 4 times

The following embodiment is an example of configuring a length 64 us WUR preamble by changing the sequence length of each of the aforementioned examples.

Example 1) Symbol length 0.5 us, Sequence length 128 used

Example 2) Symbol length 0.5 us, Sequence length 64 repeated 2 times

Example 3) Symbol length 0.5 us, Sequence length 32 repeated 4 times

Example 4) Symbol length 0.5 us, Sequence length 16 repeated 8 times

Example 5) Symbol length 0.5 us, Sequence length 8 repeated 16 times

Example 6) Symbol length 1 us, Sequence length 64 used

Example 7) Symbol length 1 us, Sequence length 32 repeated 2 times

Example 8) Symbol length 1 us, Sequence length 16 repeated 4 times

Example 9) Symbol length 1 us, Sequence length 8 repeated 8 times

Example 10) Symbol length 2 us, Sequence length 32 used

Example 11) Symbol length 2 us, Sequence length 16 repeated 2 times

Example 12) Symbol length 2 us, Sequence length 8 repeated 4 times

The following embodiment is an example of configuring a length 32 us WUR preamble by changing the sequence length of each of the aforementioned examples.

Example 1) Symbol length 0.25 us, Sequence length 128 used

Example 2) Symbol length 0.25 us, Sequence length 64 repeated 2 times

Example 3) Symbol length 0.25 us, Sequence length 32 repeated 4 times

Example 4) Symbol length 0.25 us, Sequence length 16 repeated 8 times

Example 5) Symbol length 0.25 us, Sequence length 8 repeated 16 times

Example 6) Symbol length 0.5 us, Sequence length 64 used

Example 7) Symbol length 0.5 us, Sequence length 32 repeated 2 times

Example 8) Symbol length 0.5 us, Sequence length 16 repeated 4 times

Example 9) Symbol length 0.5 us, Sequence length 8 repeated 8 times

Example 10) Symbol length 1 us, Sequence length 32 used

Example 11) Symbol length 1 us, Sequence length 16 repeated 2 times

Example 12) Symbol length 1 us, Sequence length 8 repeated 4 times

The following embodiment is an example of configuring a length 16 us WUR preamble by changing the sequence length of each of the aforementioned examples.

Example 1) Symbol length 0.125 us, Sequence length 128 used

Example 2) Symbol length 0.125 us, Sequence length 64 repeated 2 times

Example 3) Symbol length 0.125 us, Sequence length 32 repeated 4 times

Example 4) Symbol length 0.125 us, Sequence length 16 repeated 8 times

Example 5) Symbol length 0.125 us, Sequence length 8 repeated 16 times

Example 6) Symbol length 0.25 us, Sequence length 64 used

Example 7) Symbol length 0.25 us, Sequence length 32 repeated 2 times

Example 8) Symbol length 0.25 us, Sequence length 16 repeated 4 times

Example 9) Symbol length 0.25 us, Sequence length 8 repeated 8 times

Example 10) Symbol length 0.5 us, Sequence length 32 used

Example 11) Symbol length 0.5 us, Sequence length 16 repeated 2 times

Example 12) Symbol length 0.5 us, Sequence length 8 repeated 4 times

Among the aforementioned examples, since the symbol length being less than 1 us is excessively small (or short), it may be difficult to actually use such symbol length.

3) Length Configuration of WUR Preamble According to the Data Rate of a WUR Payload A case of indicating, by the main radio, a data rate being used in the payload of the WUR PPDU may be considered, and, in this case, the length of the WUR preamble may be adjusted based on the data rate and may be indirectly indicated. Various WUR preamble lengths may be used for the data rates indicated below. However, data rates other than the data rates listed below may be used, and 3 data rates may be used instead of 4 data rates.

TABLE 21

|  | 62.5 kbps | 250 kbps | 500 kbps | 1 mbps |
| --- | --- | --- | --- | --- |
| Example 1 | 128 us | 64 us | 32 us | 16 us |
| Example 2 | 128 us | 128 us | 64 us | 64 us |
| Example 3 | 128 us | 128 us | 32 us | 32 us |
| Example 4 | 128 us | 128 us | 16 us | 16 us |
| Example 5 | 128 us | 128 us | 64 us | 32 us |
| Example 6 | 128 us | 128 us | 64 us | 16 us |
| Example 7 | 128 us | 128 us | 32 us | 16 us |
| Example 8 | 128 us | 64 us | 64 us | 64 us |
| Example 9 | 128 us | 32 us | 32 us | 32 us |
| Example 10 | 128 us | 16 us | 16 us | 16 us |

The table presented above is merely exemplary, and, therefore, the WUR preamble lengths may be configured according to other various combinations. Alternatively, the main radio may select and notify two specific data rates. 62.5 kbps may always be used, and, in this case, only one additional data rate may be indicated. In case of receiving indication that two data rates will be used, when receiving the WUR packet, the WUR receiver needs to perform a process of verifying at which data rate the transmission has been performed. The verification of the data rate shall be performed in the sync part. As an example, two different sync sequences may be used (and, accordingly, the WUR preamble lengths are also different), and the WUR receiver may perform cross-correlation by using the two sequences. In this case, the complexity and power consumption, and so on, of the WUR receiver may be increased. In this case, for the two sequences, two sequences and WUR preamble lengths that are always fixed regardless of the data rate may be used, or sequences and WUR preamble lengths corresponding to the indicated two data rates may be used. In case of using two sequences that are always fixed regardless of the data rate, two sequences having excellent correlation attributes may be used. For example, a complementary Golay sequence pair may be used, and the WUR preamble lengths may be varied by adjusting the symbol lengths. In case different sequences are used based on the data rate, 4 different sequences having excellent correlation attributes may be used. In case of using two sequences and WUR preamble lengths that are always fixed regardless of the data rate, a sync sequence having a long WUR preamble may be used for a low data rate (LDR), among the data rates indicated by the main radio, and a sync sequence having a short WUR preamble may be used for a high data rate (HDR). Examples of the WUR preamble lengths of two fixed sequences are shown below.

TABLE 22

|  | Low data rate | High data rate |
| --- | --- | --- |
| Example 1 | 128 us | 64 us |
| Example 2 | 128 us | 32 us |
| Example 3 | 128 us | 16 us |
| Example 4 | 64 us | 32 us |
| Example 5 | 64 us | 16 us |
| Example 6 | 32 us | 16 us |

Alternatively, without having to perform any data rate indication process by the main radio, different sequences each having a different length based on the data rate may be used, and, by configuring a sync part based on such sequences, a WUR packet may be transmitted. In this case, since the WUR receiver shall perform cross-correlation by using all sequences, the complexity may become considerably high. However, only two data rates (62.5 kbps, 250 kbps) may be used in the WUR, and, in this case, as described above, two sequences having excellent correlation attributes and WUR preamble lengths may be used. And, herein, the sync sequence having a long WUR preamble length may be used for 62.5 kbps, and the sync sequence having a short WUR preamble length may be used for 250 kbps. In the above-described case, instead of using different sequences having excellent correlation attributes, the same sequences may be used, and the WUR preamble lengths may be varied by varying the symbol lengths.

4) Length Configuration of WUR Preamble Regardless of the Data Rate of a WUR Payload The main radio may directly indicate the WUR preamble length. This may determine the channel status after the AP and the STA have received and transmitted specific data, and this may be indicated when the AP transmits an ACK, and so on, to the STA. Examples are shown below.

4 preamble lengths used (2 bits needed): 128 us(00), 64 us(01), 32 us(10), 16 us(11)

3 preamble lengths used (2 bits needed): 128 us(00), 64 us(01), 32 us(10), reserved(11)

3 preamble lengths used (2 bits needed): 128 us(00), 64 us(01), 16 us(10), reserved(11)

3 preamble lengths used (2 bits needed): 128 us(00), 32 us(01), 16 us(10), reserved(11)

2 preamble lengths used (1 bit needed): 128 us(0), 64 us(1)

2 preamble lengths used (1 bit needed): 128 us(0), 32 us(1)

2 preamble lengths used (1 bit needed): 128 us(0), 16 us(1)

The configurations presented above are merely exemplary, and, therefore, the length of the WUR preamble may be configured of various combinations.

Additionally, hereinafter, in an 802.11ba system, various data rates may be applied to the payload of a WUR PPDU, and, in order to reduce the overhead of the WUR PPDU, the WUR PPDU may be configured by using two different types of sync parts or sync fields each having a different length. The present specification proposes various methods for indicating the data rates being applied to the payload by using two different types sync parts or sync fields.

Figure 15:
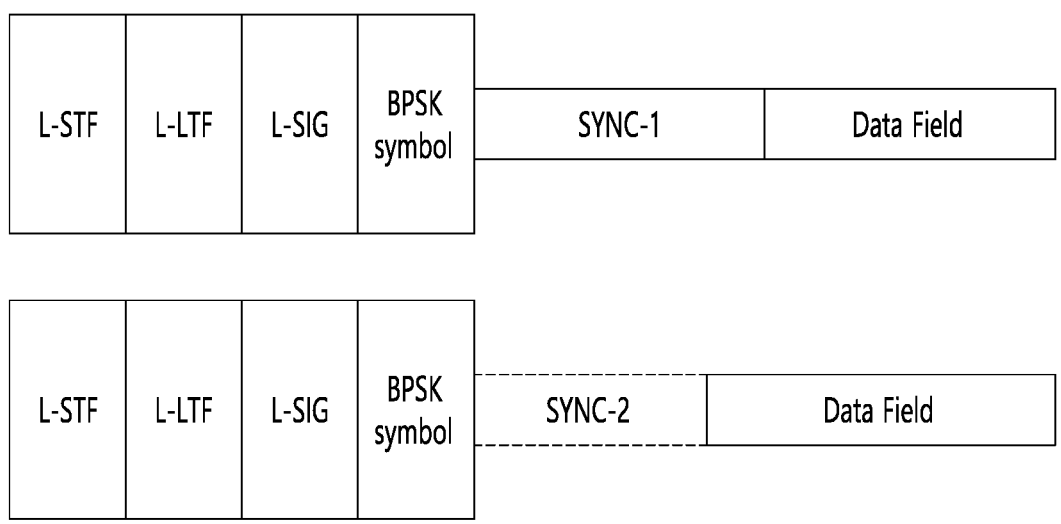
FIG. 15 illustrates an example of a wake-up packet structure having different sync parts applied thereto according to an embodiment of the present disclosure.

FIG. 15 illustrates an example of a wake-up packet structure having different sync parts applied thereto according to an embodiment of the present disclosure.

FIG. 15 shows an example of WUR PPDUs having two different types of sync parts (or sync fields) each having a different length and sequence applied thereto in an IEEE 802.11ba system. Each of sync 1 and sync 2 is configured of a sequence having the same number of 1s and 0s (or −1s) and may be designed to have an excellent auto-correlation property. Also, cross-correlation values of sync 1 and sync 2 may be designed to have small values. Thus, the receiving end may easily identify which sync is applied to a specific PPDU. (The receiving end simultaneously performs cross-correlation of the received signal by using sequences of sync 1 and sync 2.) Therefore, by using this, the two data rates may be indicated without performing any additional PHY signaling. For example, sync 1 may be used in a WUR PPDU applying a data rate of 62.5 kbps to the payload by using long sequences and symbols. Additionally, a WUR PPDU applying a data rate of 250 kbps to the payload may be used by using comparatively short sequences and symbols.

500 kbps or 1 Mbps may also be applied to the WUR payload, and this may use the relatively shorter sync 2, or shorter sync 3 and sync 4 may be designed (to each have the same number of 1s and 0s (or −1s) and to each have an excellent auto-correlation property and to have a small cross-correlation value between sync 1, 2, 3, and 4) and used. However, in case of using various syncs, since the WUR receiver shall perform cross-correlation simultaneously by using multiple sync sequences, a problem may occur in that complexity in the receiving end may be increased due to the performance of the correlator.

In order to reduce complexity in the receiving end, a case of using only sync 1 and sync 2 may be considered, and a method of indicating two or more data rates by using sync 1 and sync 2 will be proposed herein. For example, sync 1' (being in a complementary sequence relation with sync 1) and sync 2' (being in a complementary sequence relation with sync 2) having the positions of 1s and 0s (or −1s) interchanged from those of sync 1 or sync 2 may be used. Even in such case, since the receiving end performs cross-correlation by using only sync 1 and sync 2, there is no additional complexity. In case sync 1' is used in the PPDU, in case the receiving end has performed cross-correlation by using sync 1, the cross-correlation value and size are the same as the case where sync 1 is used, and a value having the opposite sign is obtained.

For example, when a sequence of sync 1 is given as 1 1 0 0, in the actual WUR PPDF, transmission may be performed as on on off off. At this point, when the receiving end performs cross-correlation with a received signal by using the sequence of sync 1, the receiving end may convert 0 to −1 and may perform cross-correlation (cross-correlation between [1 1 0 0] and [1 1−1−1]), and the value is equal to 2. When sync 1' is transmitted, the sequence is off off on on, and since the receiving end performs cross-correlation of sync 1 and the received signal, the cross-correlation value (cross-correlation between [0 0 1 1] and [1 1−1−1]) is equal to −2. In other words, it may be verified that a cross-correlation value indicating the same size but the opposite sign is obtained. Similarly, in case sync 2' is used in the PPDU, and in case the receiving end has performed cross-correlation using sync 2, a value having the same size but an opposite sign as the cross-correlation value of the case where sync 2 was used may be obtained. More specifically, according to the performance of the correlator of the receiving end, by using a cross-correlation value having the same complexity yet an opposite sign, additional indication may be possible. By using such additional indication, the sync part may be configured by using various method according to each data rate being used in the payload as shown below.

1) In Case of Using 62.5 kbps, 250 kbps, 500 kbps

Example 1) 62.5 kbps—sync 1, 250 kbps—sync 2, 500 kbps—sync 2'

Example 2) 62.5 kbps—sync 1, 250 kbps—sync 1', 500 kbps—sync 2

Example 3) 62.5 kbps—sync 1', 250 kbps—sync 2, 500 kbps—sync 2'

Example 4) 62.5 kbps—sync 1, 250 kbps—sync 1', 500 kbps—sync 2'

Example 5) 62.5 kbps—sync 1, 250 kbps—sync 2', 500 kbps—sync 2

Example 6) 62.5 kbps—sync 1', 250 kbps—sync 1, 500 kbps—sync 2

Example 7) 62.5 kbps—sync 1', 250 kbps—sync 2', 500 kbps—sync 2

Example 8) 62.5 kbps—sync 1', 250 kbps—sync 1, 500 kbps—sync 2'

2) In Case of Using 62.5 kbps, 250 kbps, 1 mbps

Example 1) 62.5 kbps—sync 1, 250 kbps—sync 2, 1 Mbps—sync 2'

Example 2) 62.5 kbps—sync 1, 250 kbps—sync 1', 1 Mbps—sync 2

Example 3) 62.5 kbps—sync 1', 250 kbps—sync 2, 1 Mbps—sync 2'

Example 4) 62.5 kbps—sync 1, 250 kbps—sync 1', 1 Mbps—sync 2'

Example 5) 62.5 kbps—sync 1, 250 kbps—sync 2', 1 Mbps—sync 2

Example 6) 62.5 kbps—sync 1', 250 kbps—sync 1, 1 Mbps—sync 2

Example 7) 62.5 kbps—sync 1', 250 kbps—sync 2', 1 Mbps—sync 2

Example 8) 62.5 kbps—sync 1', 250 kbps—sync 1, 1 Mbps—sync 2'

3) In Case of Using 62.5 kbps, 250 kbps, 500 kbps, 1 Mbps

Example 1) 62.5 kbps—sync 1, 250 kbps—sync 1', 500 kbps—sync 2, 1 Mbps—sync 2'

Example 2) 62.5 kbps—sync 1', 250 kbps—sync 1, 500 kbps—sync 2, 1 Mbps—sync 2'

Example 3) 62.5 kbps—sync 1, 250 kbps—sync 1', 500 kbps—sync 2', 1 Mbps—sync 2

Example 4) 62.5 kbps—sync 1', 250 kbps—sync 1, 500 kbps—sync 2', 1 Mbps—sync 2

Alternatively, only sync 1 and sync 1' (or only sync 2 and sync 2') may be used, and, in this case, the WUR receiver may perform cross-correlation by using only sync 1 (or sync 2) and may indicate two data rates as shown below.

1) In Case of Using 62.5 kbps, 250 kbps
Example 1) 62.5 kbps—sync 1, 250 kbps—sync 1'
Example 2) 62.5 kbps—sync 1', 250 kbps—sync 1
2) In Case of Using 62.5 kbps, 500 kbps
Example 1) 62.5 kbps—sync 1, 500 kbps—sync 1'
Example 2) 62.5 kbps—sync 1', 500 kbps—sync 1
3) In Case of Using 62.5 kbps, 1 mbps
Example 1) 62.5 kbps—sync 1, 1 mbps—sync 1'
Example 2) 62.5 kbps—sync 1', 1 mbps—sync 1
4) In Case of Using 250 kbps, 500 kbps
Example 1) 250 kbps—sync 1, 500 kbps—sync 1'
Example 2) 250 kbps—sync 1', 500 kbps—sync 1
5) In Case of Using 250 kbps, 1 mbps
Example 1) 250 kbps—sync 1, 1 mbps—sync 1'
Example 2) 250 kbps—sync 1', 1 mbps—sync 1
6) In Case of Using 500 kbps, 1 mbps
Example 1) 500 kbps—sync 1, 1 mbps—sync 1'
Example 2) 500 kbps—sync 1', 1 mbps—sync 1

Examples of various sequences that may be used in sync 1 and sync 2 are shown below.

1) Maximum Length Sequence (MLS)

By adding 0s to the existing MLS sequence, an even-number-length sequence may be configured.

Length 8: [0,1,0,0,1,1,1,0], [1,0,0,1,1,1,0,0]
Length 16: [0,1,0,0,0,1,1,1,1,0,1,0,1,1,0,0], [1,0,0,0,1,1,1,1,0,1,0,1,1,0,0,0]
Length 32: [0,1,0,0,0,0,1,0,1,0,1,1,1,0,1,1,0,0,0,1,1,1,1,1,0,0,1,1,0,1,0,0],
[1,0,0,0,0,1,0,1,0,1,1,1,0,1,1,0,0,0,1,1,1,1,1,0,0,1,1,0,1,0,0,0]

2) PN Sequence

Length 15: [1000 1111 0101 100]

The following length-32 sequence may be configured by using the PN sequence 2 times and inserting 0s at both ends.

[0,1,0,0,0,1,1,1,1,0,1,0,1,1,0,0,1,0,0,0,1,1,1,1,0,1,0,1,1,0,0]

Alternatively, the following length-32 sequence may be configured by inserting 0 in the PN sequence and repeating this 2 times.

[0,1,0,0,0,1,1,1,1,0,1,0,1,1,0,0,0,1,0,0,0,1,1,1,1,0,1,0,1,1,0,0]

3) Golay Sequence

Length 16: [0,1,0,0,0,1,1,1,1,0,1,0,1,1,0,0]
Length 32: [1,1,1,1,1,0,1,0,0,0,1,1,1,0,0,1,1,1,0,0,1,0,0,1, 0,0,0,0,1,0,1,0]
Length 64: [0,0,0,0,0,1,0,0,0,0,1,1,0,0,0,1,0,1,0,0,1,1,1,1, 0,1,0,0,0,1,1,1,0,0,1,0,0,1,0,1,1,0,1,1,1,0,1,1,0,0,0,1, 1,0,1,0, 1,0,1,1,1,1,1,0]

4) Other

Sequences having various lengths may be configured by repeating 1 and 0.

Example) Length 8: [1 0 1 0 1 0 1 0]

5) Exemplary pairs of sync 1 and sync 2 having excellent auto-correlation and cross-correlation attributes are shown below in the following table.

TABLE 23

| Length of sync 1 | Length of sync 2 | Pair of sync 1 and sync 2 |
|---|---|---|
| 16 | 16 | 1 0 0 1 1 0 1 0 1 0 1 1 1 0 0 0 |
|   |   | 1 1 0 1 0 1 1 0 0 1 0 0 0 1 0 1 |
|   |   | 1 0 1 1 0 0 0 0 1 1 1 1 0 0 1 1 0 |
| 32 | 16 | 1 0 1 1 1 1 0 1 0 0 0 0 1 0 0 1 0 |
|   |   | 1 1 1 0 0 0 1 0 0 1 1 0 1 0 1 0 |
| 32 | 32 | 1 0 1 1 0 0 1 1 1 0 0 0 0 0 1 1 0 |
|   |   | 1 0 1 0 0 1 0 0 0 1 0 1 0 1 1 1 |
|   |   | 0 0 1 0 1 1 1 1 0 1 1 1 0 0 0 1 |
|   |   | 0 1 0 1 1 0 1 0 0 0 0 1 1 0 0 1 |
| 64 | 16 | 1 1 0 0 1 1 1 1 0 1 1 1 1 0 1 0 1 |
|   |   | 1 0 1 0 0 1 1 0 1 1 0 0 0 1 0 0 |
|   |   | 1 0 0 0 0 1 1 1 0 0 0 0 0 1 0 1 |
|   |   | 0 1 1 1 1 1 0 0 1 0 1 0 1 0 0 0 |
|   |   | 1 0 1 0 1 1 0 0 1 0 0 0 1 0 1 1 |
| 64 | 32 | 1 0 1 1 0 0 1 0 1 1 0 1 0 1 1 1 |
|   |   | 0 1 1 1 1 0 0 1 1 0 0 0 1 0 1 0 |
|   |   | 1 0 0 1 0 1 1 1 1 1 0 1 0 0 0 0 |
|   |   | 0 1 1 1 0 0 0 0 1 0 0 1 0 0 0 1 |
|   |   | 1 0 1 1 0 0 1 1 1 0 0 0 0 1 1 0 |
|   |   | 1 0 1 0 0 1 0 0 0 1 0 1 0 1 1 1 |
| 64 | 64 | 0 1 1 0 1 1 1 0 1 1 0 0 1 1 0 1 |
|   |   | 0 1 0 1 0 1 1 1 1 1 0 0 0 0 0 1 |
|   |   | 0 0 0 0 1 1 0 0 0 1 0 1 0 0 1 1 |
|   |   | 1 1 0 1 0 0 0 1 1 1 0 0 1 0 0 1 |
|   |   | 1 1 1 0 0 1 0 1 0 1 0 0 0 1 1 0 |
|   |   | 0 1 1 1 1 0 1 1 1 0 1 0 1 1 0 1 |
|   |   | 0 0 1 1 0 1 1 0 0 0 1 0 0 1 0 0 |
|   |   | 0 0 1 1 1 0 0 0 0 0 1 0 1 0 1 1 |

In the above-described embodiment, sync 2 may be used as sync 1, and, conversely, sync 1 may be used as sync 2. In the above-described embodiment, if sync 1 is given as 1 0 1 1 0 0 1 0 1 1 0 1 0 1 1 1 0 1 1 1 1 0 0 1 1 0 0 0 1 0 1 0 1 0 0 1 0 1 1 1 1 1 0 1 0 0 0 0 0 1 1 1 0 0 0 0 1 0 0 1 0 0 0 1, sync 1' is 0 1 0 0 1 1 0 1 0 0 1 0 1 0 0 0 1 0 0 0 0 1 1 0 0 1 1 1 0 1 0 1 0 1 1 0 1 0 0 0 0 0 1 0 1 1 1 1 1 0 0 0 1 1 1 1 0 1 1 0 1 1 1 0.

Such method may be directly applied to various types of sync 1 or sync 2.

In the above-described embodiment, the duration of each bit in a sequence may be 1 us, 2 us or 4 us. However, the duration will not be limited only to this.

Figure 16:
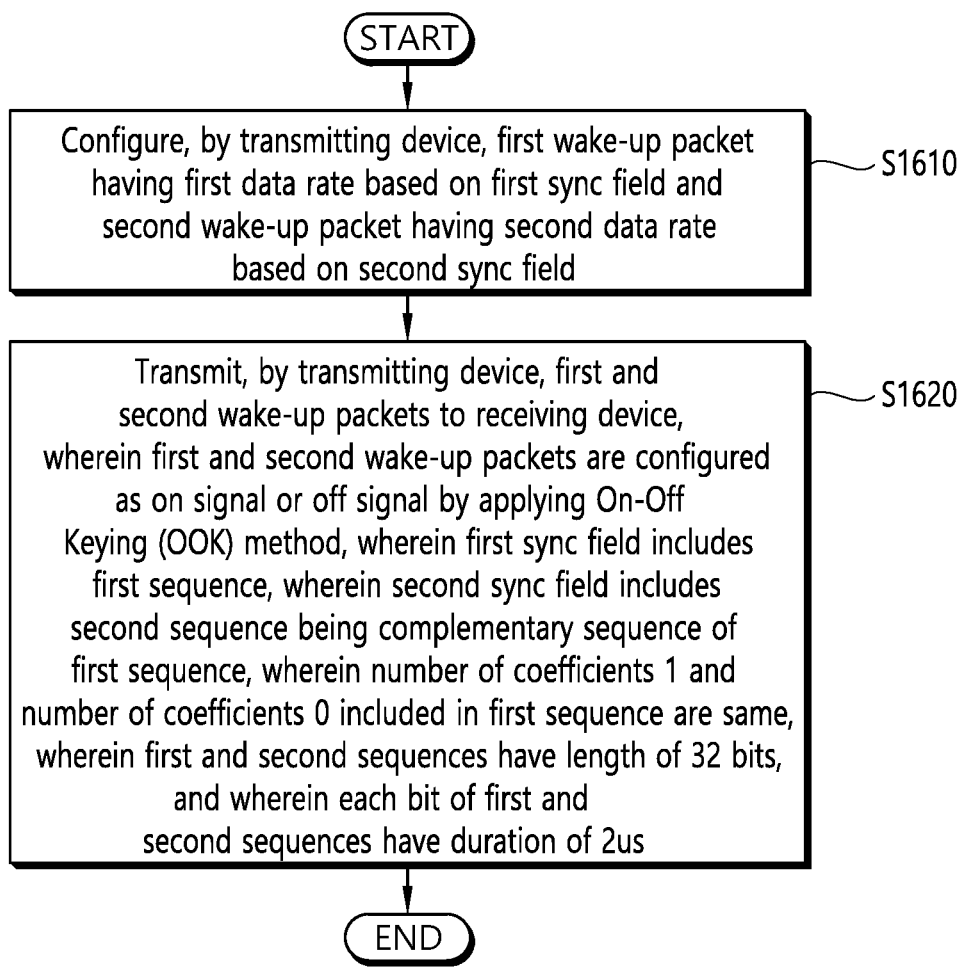
FIG. 16 is a flowchart illustrating a procedure of transmitting a wake-up frame by applying an OOK method according to the present embodiment.

FIG. 16 is a flowchart illustrating a procedure of transmitting a wake-up frame by applying an OOK method according to the present embodiment.

An example of FIG. 16 is performed by a transmitting device, and a receiving device may correspond to a low-power wake-up receiver, and the transmitting device may correspond to an AP.

First, terms are defined. An on signal may correspond to a signal having an actual power value. An off signal may correspond to a signal having no actual power value.

In step S1610, the transmitting device configures a first wake-up packet having a first data rate based on a first sync field and a second wake-up packet having a second data rate based on a second sync field.

In step S1620, the transmitting device transmits the first and second wake-up packets to the receiving device.

Hereinafter, how to configure the first and second wake-up packets will be described.

The first and second wake-up packets are configured of an on signal or an off signal by applying an On-Off Keying (OOK) method (or scheme).

The on signal or the off signal is generated by applying a third sequence to 13 consecutive subcarriers in a 20 MHz band and by performing 64-point Inverse Fast Fourier Transform (IFFT).

For example, coefficients may be inserted to all of the 13 subcarriers. At this point the generated signal may be a signal having a length of 3.2 us and not having any cycle period. A cyclic prefix (CP) is inserted to the generated signal, thereby generating an on signal or off signal having a length of 4 us. The coefficient may be selected from 1, −1, j or −j.

As another example, coefficients may be inserted in the 13 subcarriers in units of 2 subcarriers, and 0 may be inserted in the remaining subcarriers. More specifically, the first sequence may be configured of coefficients in units of 2 spaces and may be configured of 0 in the remaining parts. At this point, the generated signal may be a 3.2 us signal having a cycle period of 1.6 us. A cyclic prefix (CP) may be inserted to the generated signal, or masking may be performed without inserting any CP. Herein, masking may correspond to a method of covering part of the signal and obtaining only the remaining part of the signal. More specifically, by obtaining part of the generated signal, an on signal or off signal having a length of 2 us may be generated (CP+1.6 us).

As another example, coefficients may be inserted in the 13 subcarriers in units of 4 subcarriers, and 0 may be inserted in the remaining subcarriers. More specifically, the first sequence may be configured of coefficients in units of 4 spaces and may be configured of 0 in the remaining parts. At this point, the generated signal may be a 3.2 us signal having a cycle period of 0.8 us. A cyclic prefix (CP) may be inserted to the generated signal, or masking may be performed without inserting any CP. Herein, masking may correspond to a method of covering part of the signal and obtaining only the remaining part of the signal. More specifically, by obtaining part of the generated signal, an on signal or off signal having a length of 1 us may be generated (CP+0.8 us).

As another example, coefficients may be inserted in the 13 subcarriers in units of 8 subcarriers, and 0 may be inserted in the remaining subcarriers. More specifically, the first sequence may be configured of coefficients in units of 8 spaces and may be configured of 0 in the remaining parts. At this point, the generated signal may be a 3.2 us signal having a cycle period of 0.4 us. A cyclic prefix (CP) may be inserted to the generated signal, or masking may be performed without inserting any CP. Herein, masking may correspond to a method of covering part of the signal and obtaining only the remaining part of the signal. More specifically, by obtaining part of the generated signal, an on signal or off signal having a length of 0.5 us may be generated (CP+0.4 us).

The off signal may be generated by inserting 0s to 13 consecutive subcarriers of the 20 MHz band and by performing 64-point IFFT. The off signal may also have the lengths of 2 us, 1 us, or 0.5 us by performing masking (CP+1.6 us, CP+0.8 us, CP+0.4 us).

How to configure the first and second sync fields will hereinafter be described.

The first sync field includes a first sequence. The second sync field includes a second sequence, which is a complementary sequence of the first sequence. Additionally, the number of coefficients 1 and the number of coefficients 0 included in the first sequence are the same. Accordingly, the number of coefficients 1 and the number of coefficients 0 included in the second sequence may also be the same. This is to indicate that signs of cross-correlation values according to the first sequence and the second sequence, which will be described later on, are opposite signs.

The receiving device may use the first sequence and the second sequence to perform cross-correlation for the received signal (wake-up packet). At this point, since the first sequence and the second sequence are in a complementary sequence relation, the receiving device may perform cross-correlation by using only the first sequence. Thus, complexity in the receiving device may be reduced. In other words, there is no need to perform cross-correlation by using both the first sequence and the second sequence. At this point, a cross-correlation value for a signal that is received by using the first sequence and a cross-correlation value for a signal that is received by using the second sequence may have the same size and the opposite sign.

Accordingly, in case the sign is +, this may indicate a wake-up packet having a low data rate (LDR), and, in case the signa is −, this may indicate a wake-up packet having a high data rate (HDR). More specifically, the transmitting device may indicate the data rates being applied to the wake-up packet through the signs. Thus, the transmitting device may be capable of indicating the data rates being applied to the wake-up packet by using two different types of sync fields (first sync field and second sync field).

For example, the first data rate may be 62.5 Kbps, and the second data rate may be 250 Kbps. Additionally, in case the sign is +, this may indicate an HDR, and in case the sign is −, this may indicate an LDR.

Additionally, the first sequence and the second sequence have the lengths of 32 bits. Each bit of the first sequence and the second sequence has a duration of 2 us. One bit of the first sequence may correspond to one symbol configuring the first sync field. Additionally, one bit of the second sequence may correspond to one symbol configuring the second sync field.

For example, the first sequence may be [1 0 1 0 0 1 0 0 1 0 1 1 1 0 1 1 0 0 0 1 0 1 1 1 0 0 1 1 1 0 0 0]. At this point, the second sequence may be [0 1 0 1 1 0 1 1 0 1 0 0 0 1 0 0 1 1 1 0 1 0 0 0 1 1 0 0 0 1 1 1]. More specifically, the first sequence and the second sequence may have a complementary sequence relation.

As another example, the first sequence may be [1 0 1 1 0 0 0 0 1 1 1 0 0 1 1 0 1 0 1 1 1 1 0 1 0 0 0 1 0 0 1 0]. At this point, the second sequence may be [0 1 0 0 1 1 1 1 0 0 0 1 1 0 0 1 0 1 0 0 0 0 1 0 1 1 1 0 1 1 0 1]. More specifically, the first sequence and the second sequence may have a complementary sequence relation.

As another example, the first sequence may be [1 0 1 1 0 0 1 1 1 0 0 0 0 1 1 0 1 0 1 0 0 1 0 0 0 1 0 1 0 1 1 1]. At this point, the second sequence may be [0 1 0 0 1 1 0 0 0 1 1 1 1 0 0 1 0 1 0 1 1 0 1 1 1 0 1 0 1 0 0 0]. More specifically, the first sequence and the second sequence may have a complementary sequence relation.

The first sync field may be included in a preamble of the first wake-up packet. At this point, a length of the preamble of the first wake-up packet may be determined based on the first data rate.

Additionally, the second sync field may be included in a preamble of the second wake-up packet. At this point, a length of the preamble of the second wake-up packet may be determined based on the second data rate. More specifically, the length of the preamble may be adjusted according to the data rate being applied to the wake-up packet.

Additionally, the first sync field may include a sequence configured by repeating the first sequence 2 times. The first sync field may have a duration of 128 us. This is because the first sequence has a length of 32 bits and each bit of the first sequence has a duration of 2 us (32*2*2).

Additionally, the second sync field may have a duration of 64 us. This is because the second sequence has a length of 32 bits and each bit of the second sequence has a duration of 2 us (32*2). In other words, the second sequence is not repeated and may be directly included in the second sync field.

Furthermore, the transmitting device may know the power values of the on signal and the off signal beforehand and may then configure the on signal and the off signal. By decoding the on signal and the off signal by using an envelope detector, the receiving device may reduce the power being consumed during the decoding process.

Figure 17:
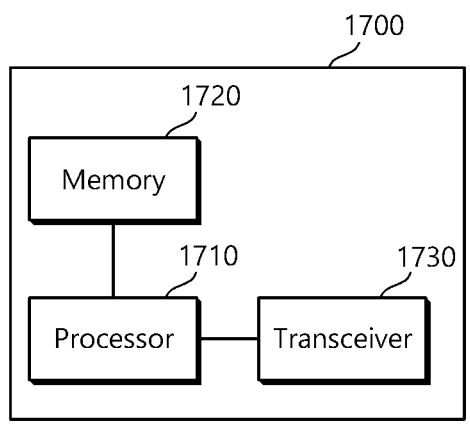
FIG. 17 is a block view illustrating a wireless device to which the exemplary embodiment of the present disclosure can be applied.

FIG. 17 is a block view illustrating a wireless device to which the exemplary embodiment of the present specification can be applied.

Referring to FIG. 17, as an STA that can implement the above-described exemplary embodiment, the wireless device may correspond to an AP or a non-AP station (STA). The wireless device may correspond to the above-described user or may correspond to a transmission device transmitting a signal to the user.

The wireless apparatus of FIG. 17, as shown, includes a processor (1710), a memory (1720), and a transceiver (1730). The illustrated processor (1710), memory (1720), and transceiver (1730) may be implemented as separate chips, respectively, or at least two blocks/functions may be implemented through a single chip.

The transceiver (1730) is a device including a transmitter and a receiver. If a specific operation is performed, only an operation of any one of the transmitter and the receiver may be performed or operations of both the transmitter and the receiver may be performed. The transceiver (1730) may include one or more antennas for transmitting and/or receiving a radio signal. Furthermore, the transceiver (1730) may include an amplifier for amplifying a received signal and/or a transmission signal and a bandpass filter for transmission on a specific frequency band.

The processor (1710) may implement the functions, processes and/or methods proposed in this specification. For example, the processor (1710) may perform the above-described operations according to the present embodiment. That is, processor (1710) may perform the operations disclosed in the embodiments of FIGS. 1 to 16.

The processor (1710) may include application-specific integrated circuits (ASIC), other chipsets, logic circuits, data processors and/or a converter for converting a baseband signal into a radio signal, and vice versa. The memory (1720) may include a read-only memory (ROM), a random access memory (RAM), a flash memory, a memory card, a storage medium and/or other storage devices.

Figure 18:
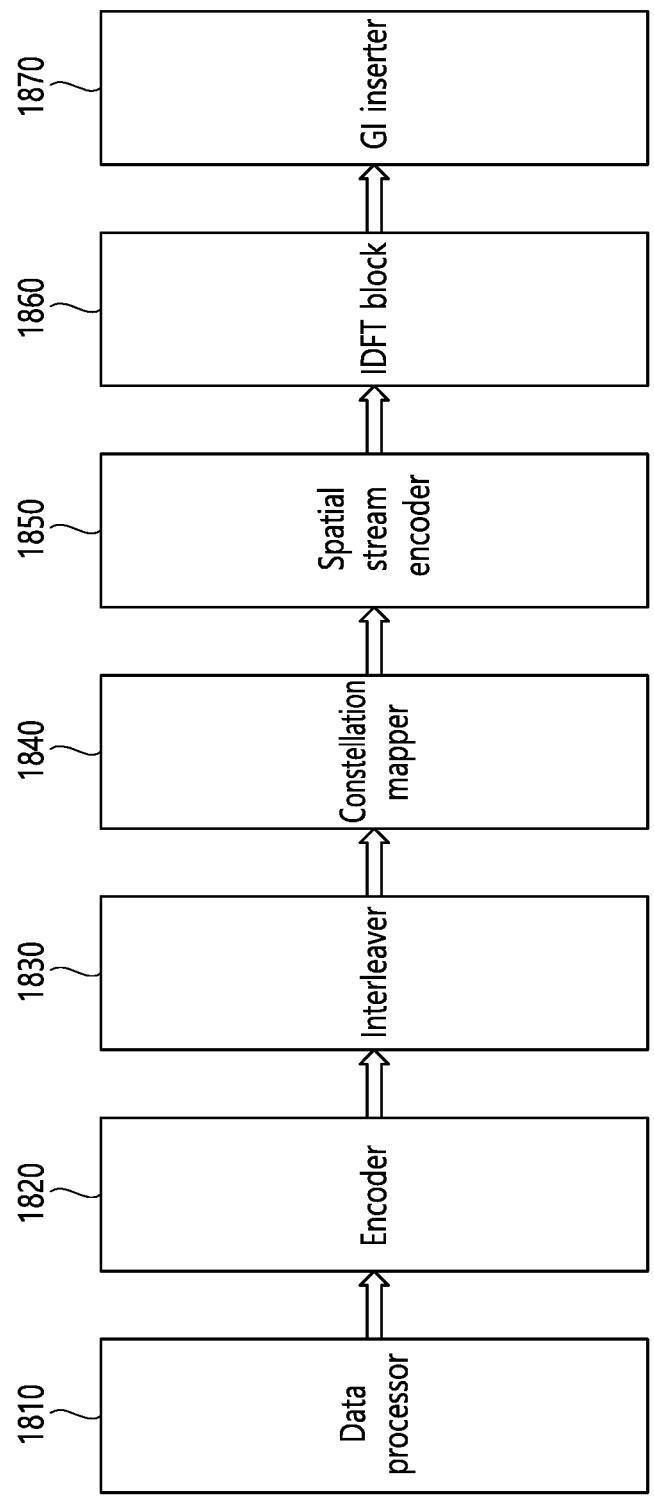
FIG. 18 is a block diagram illustrating an example of an apparatus included in a processor.

FIG. 18 is a block diagram illustrating an example of an apparatus included in a processor. For convenience of description, the example of FIG. 18 has been described based on blocks for a transmission signal, but it is evident that a received signal can be processed using the corresponding blocks.

An illustrated data processor (1810) generates transmission data (control data and/or user data) corresponding to a transmission signal. The output of the data processor (1810) may be input to an encoder (1820). The encoder (1820) may perform coding through a binary convolutional code (BCC) or a low-density parity-check (LDPC) scheme. At least one encoder (1820) may be included. The number of encoders (1820) may be determined depending on various pieces of information (e.g., the number of data streams).

The output of the encoder (1820) may be input to an interleaver (1830). The interleaver (1830) performs an operation of distributing consecutive bit signals on a radio resource (e.g., time and/or frequency) in order to prevent a burst error attributable to fading. At least one interleaver (1830) may be included. The number of interleavers (1830) may be determined depending on various pieces of information (e.g., the number of spatial streams).

The output of the interleaver (1830) may be input to a constellation mapper (1840). The constellation mapper (1840) performs constellation mapping, such as biphase shift keying (BPSK), quadrature phase shift keying (QPSK), or quadrature amplitude modulation (n-QAM).

The output of the constellation mapper (1840) may be input to a spatial stream encoder (1850). The spatial stream encoder (1850) performs data processing in order to transmit a transmission signal through at least one spatial stream. For example, the spatial stream encoder (1850) may perform at least one of space-time block coding (STBC), cyclic shift diversity (CSD) insertion and spatial mapping on a transmission signal.

The output of the spatial stream encoder (1850) may be input to an IDFT block (1860). The IDFT block (1860) performs inverse discrete Fourier transform (IDFT) or inverse Fast Fourier transform (IFFT).

The output of the IDFT block (1860) is input to a guard interval (GI) inserter (1870). The output of the GI inserter (1870) is input to the transceiver (1730) of FIG. 17.

What is claimed is:

1. A method for transmitting a wake-up packet in a wireless LAN system, the method comprising:

configuring, by a transmitting device, a first wake-up packet having a first data rate based on a first sync field and a second wake-up packet having a second data rate based on a second sync field; and transmitting, by the transmitting device, the first and second wake-up packets to a receiving device, wherein the first and second wake-up packets are configured as an on signal or an off signal by applying an On-Off Keying (OOK) method, wherein the first sync field includes a first sequence, wherein the second sync field includes a second sequence being a complementary sequence of the first sequence, wherein a number of coefficients 1 and a number of coefficients 0 included in the first sequence are the same, wherein the first and second sequences have a length of 32 bits, and wherein each bit of the first and second sequences have a duration of 2 us.

2. The method of claim 1, wherein a first data rate is 62.5 Kbps, and wherein a second data rate is 250 Kbps.

3. The method of claim 1, wherein the first sequence is [1 0 1 0 0 1 0 0 1 0 1 1 1 0 1 1 0 0 0 1 0 1 1 1 0 0 1 1 1 0 0 0],and wherein the second sequence is [0 1 0 1 1 0 1 1 0 1 0 0 0 1 0 0 1 1 1 0 1 0 0 0 1 1 0 0 0 1 1 1].

4. The method of claim 3, wherein the first sync field is included in a preamble of the first wake-up packet, wherein the first sync field includes a sequence configured of the first sequence being repeated 2 times, and wherein the first sync field has a duration of 128 us.

5. The method of claim 4, wherein a length of a preamble of the first wake-up packet is determined based on the first data rate.

6. The method of claim 3, wherein the second sync field is included in a preamble of the second wake-up packet, and wherein the second sync field has a duration of 64 us.

7. The method of claim 6, wherein a length of a preamble of the second wake-up packet is determined based on the second data rate.

8. The method of claim 1, wherein a number of coefficients 1 and a number of coefficients 0 included in the second sequence are the same.

9. The method of claim 1, wherein the first sequence is [1 0 1 1 0 0 0 0 1 1 1 0 0 1 1 0 1 0 1 1 1 1 0 1 0 0 0 1 0 0 1 0], and wherein the second sequence is [0 1 0 0 1 1 1 1 0 0 0 1 1 0 0 1 0 1 0 0 0 0 1 0 1 1 1 0 1 1 0 1].

10. The method of claim 1, wherein the first sequence is [1 0 1 1 0 0 1 1 1 0 0 0 0 1 1 0 1 0 1 0 0 1 0 0 0 1 0 1 0 1 1 1],and wherein the second sequence is [0 1 0 0 1 1 0 0 0 1 1 1 1 0 0 1 0 1 0 1 1 0 1 1 1 0 1 0 1 0 0 0].

11. The method of claim 1, wherein the on signal or the off signal is generated by applying a third sequence to 13 consecutive subcarriers in a 20 MHz band and by performing 64-point Inverse Fast Fourier Transform (IFFT).

12. A transmitting device for transmitting a wake-up packet in a wireless LAN system, the transmitting device comprising:

a transceiver transmitting or receiving radio signals; and a processor controlling the transceiver, wherein the processor is configured to:

configure a first wake-up packet having a first data rate based on a first sync field and a second wake-up packet having a second data rate based on a second sync field, and transmit the first and second wake-up packets to a receiving device, wherein the first and second wake-up packets are configured as an on signal or an off signal by applying an On-Off Keying (OOK) method, wherein the first sync field includes a first sequence, wherein the second sync field includes a second sequence being a complementary sequence of the first sequence, wherein a number of coefficients 1 and a number of coefficients 0 included in the first sequence are the same, wherein the first and second sequences have a length of 32 bits, and wherein each bit of the first and second sequences have a duration of 2 us.

13. The transmitting device of claim 12, wherein a first data rate is 62.5 Kbps, and wherein a second data rate is 250 Kbps.

14. The transmitting device of claim 12, wherein the first sequence is [1 0 1 0 0 1 0 0 1 0 1 1 1 0 1 1 0 0 0 1 0 1 1 1 0 0 1 1 1 0 0 0],and wherein the second sequence is [0 1 0 1 1 0 1 1 0 1 0 0 0 1 0 0 1 1 1 0 1 0 0 0 1 1 0 0 0 1 1 1].

15. The transmitting device of claim 14, wherein the first sync field is included in a preamble of the first wake-up packet, wherein the first sync field includes a sequence configured of the first sequence being repeated 2 times, and wherein the first sync field has a duration of 128 us.

16. The transmitting device of claim 14, wherein the second sync field is included in a preamble of the second wake-up packet, and wherein the second sync field has a duration of 64 us.

* * * * *